US012083971B2

(12) United States Patent
Ujiie et al.

(10) Patent No.: US 12,083,971 B2
(45) Date of Patent: Sep. 10, 2024

(54) ANOMALY HANDLING METHOD AND ANOMALY HANDLING DEVICE

(71) Applicant: Panasonic Intellectual Property Corporation of America, Torrance, CA (US)

(72) Inventors: Yoshihiro Ujiie, Osaka (JP); Takeshi Kishikawa, Osaka (JP); Ryo Hirano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1022 days.

(21) Appl. No.: 17/031,224

(22) Filed: Sep. 24, 2020

(65) Prior Publication Data
US 2021/0001793 A1 Jan. 7, 2021

Related U.S. Application Data

(63) Continuation of application No. PCT/JP2019/028836, filed on Jul. 23, 2019.

(30) Foreign Application Priority Data

Jul. 27, 2018 (WO) .................. PCT/JP2018/028297

(51) Int. Cl.
*B60R 16/023* (2006.01)
*H04L 12/44* (2006.01)
(Continued)

(52) U.S. Cl.
CPC .......... *B60R 16/0232* (2013.01); *H04L 12/44* (2013.01); *H04L 12/6418* (2013.01);
(Continued)

(58) Field of Classification Search
CPC . B60R 16/0232; H04L 12/44; H04L 12/6418; H04L 2012/40215;
(Continued)

(56) References Cited

U.S. PATENT DOCUMENTS 8,423,870 B1 * 4/2013 Chiachanavong .. H03M 13/333
714/776
10,986,105 B2 * 4/2021 Maeda ................ B60R 16/0232
(Continued)

FOREIGN PATENT DOCUMENTS

EP     3 133 774       2/2017
JP     2009-516410     4/2009
(Continued)

OTHER PUBLICATIONS

Extended European Search Report issued Aug. 13, 2021 in corresponding European Patent Application No. 19841334.6.
(Continued)

*Primary Examiner* — Schquita D Goodwin
(74) *Attorney, Agent, or Firm* — Wenderoth, Lind & Ponack, L.L.P.

(57) ABSTRACT

An anomaly handling method in an in-vehicle network includes: transmitting and receiving frames; detecting a frame having an anomaly; and switching, when the anomaly is detected in the detecting, a transmission timing of the frame in which the anomaly is detected. The switching includes changing a switched transmission timing to which the transmission timing is switched, according to predetermined information.

15 Claims, 23 Drawing Sheets

(51) Int. Cl.
*H04L 12/64* (2006.01)
*H04L 12/40* (2006.01)

(52) U.S. Cl.
CPC ............ *H04L 2012/40215* (2013.01); *H04L 2012/40273* (2013.01); *H04L 2012/644* (2013.01)

(58) Field of Classification Search
CPC ..... H04L 2012/40273; H04L 2012/644; H04L 12/40084; H04L 63/1425; H04L 63/1433; H04L 12/4013; H04L 2012/40241; H04L 63/1408; H04L 12/40
See application file for complete search history.

(56) References Cited

U.S. PATENT DOCUMENTS

| | | | | |
|---|---|---|---|---|
| 11,343,116 | B2* | 5/2022 | Liu | H04L 12/40 |
| 11,765,186 | B2* | 9/2023 | Maeda | B60R 16/0232 |
| | | | | 726/23 |
| 2009/0262649 | A1 | 10/2009 | Zinke | H04L 43/00 |
| | | | | 370/242 |
| 2014/0328352 | A1* | 11/2014 | Mabuchi | H04L 12/4035 |
| | | | | 370/451 |
| 2015/0124597 | A1* | 5/2015 | Mabuchi | H04L 47/24 |
| | | | | 370/230 |
| 2015/0220412 | A1* | 8/2015 | Mabuchi | G06F 11/3051 |
| | | | | 710/18 |
| 2015/0372807 | A1* | 12/2015 | Khoyi | G06F 16/116 |
| | | | | 713/150 |
| 2016/0197932 | A1* | 7/2016 | Hoffman | H04L 63/1441 |
| | | | | 726/4 |
| 2016/0323287 | A1 | 11/2016 | Kishikawa et al. | |
| 2017/0126703 | A1* | 5/2017 | Ujiie | H04L 67/12 |
| 2017/0286690 | A1* | 10/2017 | Chari | G06F 21/577 |
| 2019/0312895 | A1 | 10/2019 | Fujimura et al. | |

FOREIGN PATENT DOCUMENTS

| | | |
|---|---|---|
| JP | 5664799 | 2/2015 |
| WO | 2007/054877 | 5/2007 |
| WO | 2013/094072 | 6/2013 |
| WO | 2013/171829 | 11/2013 |
| WO | 2016/116973 | 7/2016 |
| WO | 2018/131334 | 7/2018 |

OTHER PUBLICATIONS

International Search Report (ISR) issued on Sep. 24, 2019 in International (PCT) Application No. PCT/JP2019/028836.
International Search Report (ISR) issued on Oct. 9, 2018 in International (PCT) Application No. PCT/JP2018/028297.

* cited by examiner

FIG. 5

| PARAMETER | VALUE |
|---|---|
| BAUD RATE | 10 Mbps |
| STATIC SEGMENT SLOT ID | 1 ~ 50 |
| DYNAMIC SEGMENT SLOT ID | 51 ~ 100 |
| STATIC SLOT PAYLOAD LENGTH | 8 |
| ... | ... |

FIG. 7

| SLOT ID | CYCLE OFFSET | CYCLE RECEPTION | FRAME NAME | PAYLOAD INFORMATION |
|---|---|---|---|---|
| 1 | 0 | 1 | A | SPEED |
| 2 | | | | |
| 3 | 0 | 2 | B | GEAR STATE |
| ... | ... | ... | ... | ... |
| 98 | 0 | 2 | C | FRONT CAMERA INFORMATION 1 |
| | 1 | 2 | D | FRONT CAMERA INFORMATION 2 |
| 99 | 0 | 2 | E | REAR CAMERA INFORMATION 1 |
| | 1 | 2 | F | REAR CAMERA INFORMATION 2 |
| 100 | | | | |
| ... | ... | ... | ... | ... |

FIG. 8

| CYCLE | SLOT ID | | | | | | |
|---|---|---|---|---|---|---|---|
| | | 1 | 2 | 3 | ... | 98 | 99 | 100 |
| | 0 | A | | B | | C | E | |
| | 1 | A | | | | D | F | |
| | 2 | A | | B | | C | E | |
| | ... | | | | | | | |
| | 61 | A | | | | D | F | |
| | 62 | A | | B | | C | E | |
| | 63 | A | | | | D | F | |

FIG. 9

| No. | BEFORE CHANGE ID | AFTER CHANGE ID |
|---|---|---|
| 1 | 1 | 97 |
| 2 | 3 | 100 |
| 3 | 98 | 99 |
| 4 | 99 | 98 |

FIG. 13

| No. | STATE | BEFORE CHANGE ID | AFTER CHANGE ID |
|---|---|---|---|
| 1 | ALWAYS | 1 | 97 |
| 2 | ALWAYS | 3 | 100 |
| 3 | DRIVING | 98 | 99 |
| 4 | DRIVING | 99 | 98 |

FIG. 15

| SWITCHING RULE NUMBER | PAYLOAD SEGMENT BIT SHIFT AMOUNT | SLOT ID INCREASE (SWITCHED SLOT ID) |
|---|---|---|
| 0 | 0 | 0 (SLOT ID: 100) |
| 1 | 1 | 1 (SLOT ID: 101) |
| 2 | 2 | 2 (SLOT ID: 102) |
| ... | ... | ... |
| N | N | N (SLOT ID: 100 + N) |

FIG. 20

| SLOT ID | CYCLE OFFSET | CYCLE RECEPTION | TRANSMISSION SOURCE BRANCH | PAYLOAD INFORMATION | RISK |
|---|---|---|---|---|---|
| 1 | 0 | 1 | 100b | SPEED | LOW |
| 2 | | | | | |
| 3 | 0 | 2 | 100a | STEERING WHEEL ANGLE | MEDIUM |
| 4 | 1 | 2 | 100b | GEAR STATE | LOW |
| 5 | 0 | 1 | 100b | BRAKE HYDRAULIC PRESSURE | MEDIUM |
| 6 | 2 | 4 | 100d | STEERING WHEEL STEERING INSTRUCTION | HIGH |
| ... | ... | ... | ... | ... | ... |

ANOMALY HANDLING METHOD AND ANOMALY HANDLING DEVICE

CROSS REFERENCE TO RELATED APPLICATIONS

This application is a U.S. continuation application of PCT International Patent Application Number PCT/JP2019/028836 filed on Jul. 23, 2019, claiming the benefit of priority of PCT International Patent Application Number PCT/JP2018/028297 filed on Jul. 27, 2018, the entire contents of which are hereby incorporated by reference.

BACKGROUND

1. Technical Field

The present disclosure relates to an anomaly handling method and an anomaly handling device in an in-vehicle network.

2. Description of the Related Art

Systems in automobiles in recent years include many devices called electronic control units (hereafter, ECUs). A network connecting these ECUs is called an in-vehicle network. There are a number of standards for in-vehicle networks. FlexRay® is a standard designed as a protocol faster and more reliable than the currently dominant Controller Area Network (hereafter, CAN®).

In FlexRay, the value of "0" and the value of "1" are represented by the voltage difference between two stranded wires. Each ECU connected to a bus is referred to as a node. Each node connected to a bus transmits and receives messages called frames. FlexRay uses a time-division multiple access (hereafter, TDMA) scheme, with each node transmitting frames at predetermined timings.

In FlexRay, the maximum time unit is a cycle. Each node is synchronized on a global time base. A cycle is composed of four segments, namely, "static segment", "dynamic segment", "symbol window", and "network idle time". The dynamic segment and the symbol window are optional. Each node transmits frames in the static segment and the dynamic segment. Each of the static segment and the dynamic segment is further composed of slots, i.e. a period of time in which one frame can be transmitted.

In FlexRay, there is no identifier indicating a transmission destination or a transmission source, and a transmission node transmits each frame based on a slot number which is a transmission timing set beforehand for the frame. Each reception node receives only a frame of a predetermined slot number. Cycle multiplexing is used in some cases. Cycle multiplexing is a method of communicating different frames among cycles even though the frames have the same slot number.

In FlexRay, not only a bus network topology in which all nodes are connected to one bus as in CAN but also a star network topology via a star coupler, a hybrid star-bus network topology, and the like can be designed.

Regarding security, CAN is subjected to threats such as an attacker accessing the CAN bus and transmitting an anomalous (i.e. unauthorized, hereafter the same) frame to anomalously control an ECU. Security measures against such threats are under study.

For example, Japanese Patent No. 5664799 proposes an in-vehicle network monitoring device, and discloses a method of preventing control by an anomalous frame by detecting whether frames are transmitted to the CAN at communication intervals prescribed beforehand and determining any frame not conforming to the prescribed communication intervals as anomalous.

SUMMARY

However, the anomaly detection method described in Japanese Patent No. 5664799 is not applicable to FlexRay using a TDMA scheme, because communication is performed at communication intervals prescribed beforehand. Moreover, security improvement in CAN is desired.

To solve the problem stated above, the present disclosure has an object of providing an anomaly handling method and an anomaly handling device that can realize a secure in-vehicle network system by reducing the range of influence by an anomalously transmitted frame.

To achieve the object, an anomaly handling method according to an aspect of the present disclosure is an anomaly handling method in an in-vehicle network, the anomaly handling method including: transmitting and receiving frames; detecting a frame having an anomaly; and switching, when the anomaly is detected in the detecting, a transmission timing of the frame in which the anomaly is detected, wherein the switching includes changing a switched transmission timing to which the transmission timing is switched, according to predetermined information.

An anomaly handling device according to an aspect of the present disclosure is an anomaly handling device in an in-vehicle network, the anomaly handling device including: a frame transmitter/receiver that transmits and receives frames; a processor; and a memory including at least one set of instructions that, when executed by the processor, causes the processor to perform operations including: detecting a frame having an anomaly; and switching, when the anomaly is detected in the detecting, a transmission timing of the frame in which the anomaly is detected, wherein the switching includes changing a switched transmission timing to which the transmission timing is switched, according to predetermined information.

With the anomaly handling method, etc. according to an aspect of the present disclosure, a secure in-vehicle network system can be realized.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a diagram illustrating an example of communication setting parameters of FlexRay communication in Embodiment 1;

FIG. 7 is a diagram illustrating an example of a frame list transmitted in FlexRay communication in Embodiment 1;

FIG. 8 is a diagram illustrating an example of a frame transmission schedule of FlexRay communication in Embodiment 1;

FIG. 9 is a diagram illustrating an example of a switching table in Embodiment 1;

FIG. 13 is a diagram illustrating an example of a switching table in Embodiment 2;

FIG. 15 is a diagram illustrating an example of a switching table in Embodiment 3;

FIG. 20 is a diagram illustrating an example of a frame list transmitted in FlexRay communication in Embodiment 4;

DETAILED DESCRIPTION OF THE EMBODIMENTS

Figure 1:
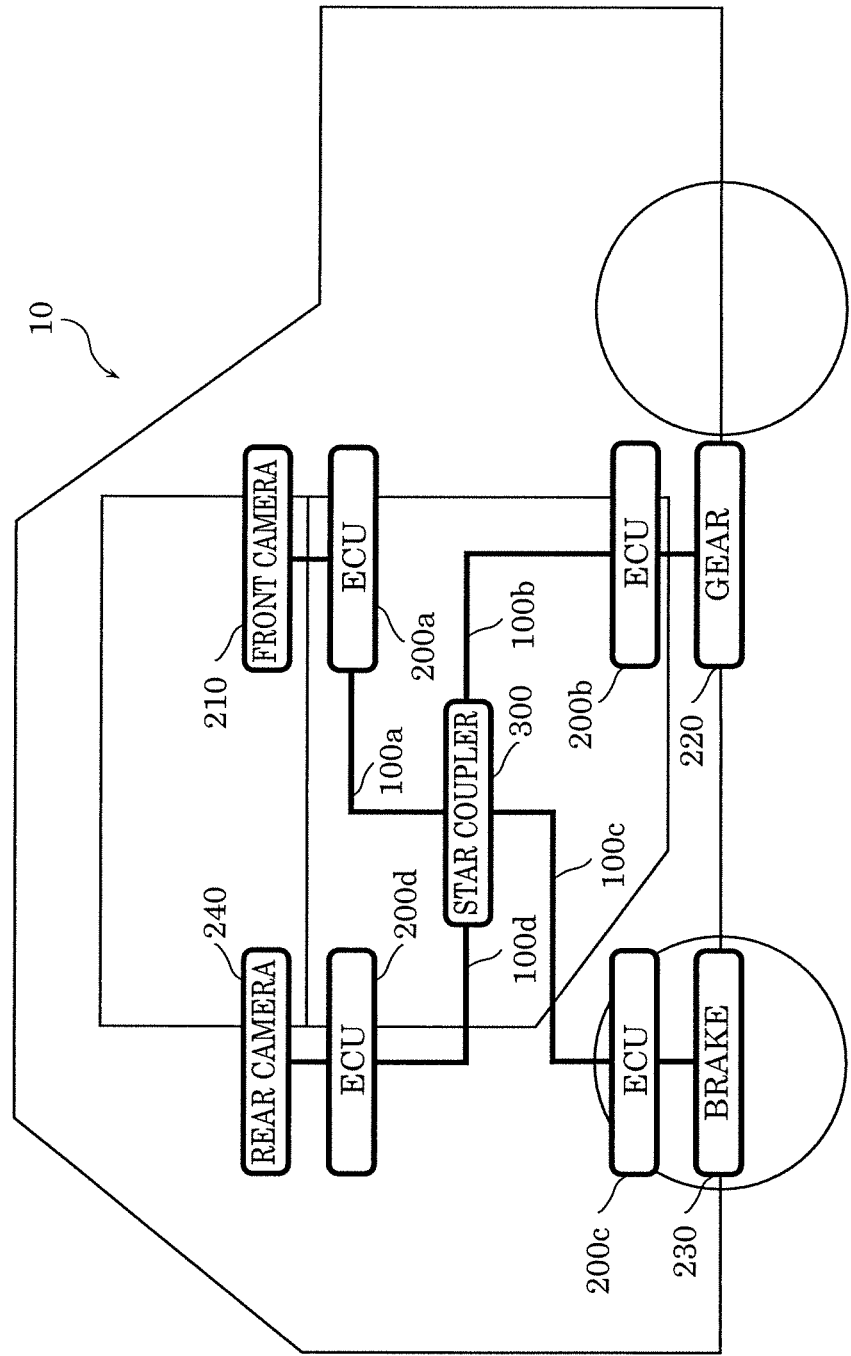
FIG. 1 is a diagram illustrating an overall structure of an in-vehicle network system in Embodiment 1.

An anomaly handling method according to an aspect of the present disclosure is an anomaly handling method in an in-vehicle network, the anomaly handling method including: transmitting and receiving frames; detecting a frame having an anomaly; and switching, when the anomaly is detected in the detecting, a transmission timing of the frame in which the anomaly is detected, wherein the switching includes changing a switched transmission timing to which the transmission timing is switched, according to predetermined information.

Thus, the switched transmission timing (e.g. the switched slot ID) is determined dynamically. This makes it difficult for an attacker to predict the switched transmission timing. That is, correct information of a frame can be transmitted to another ECU at the switched transmission timing. For example, an attack at the switched transmission timing can be suppressed as compared with the case where the switched transmission timing is determined based on a simple table or the like. Therefore, even when an anomalous frame (a frame having an anomaly) is transmitted to the in-vehicle network, the secure state of the in-vehicle network system as a whole can be maintained by detecting the anomalous frame and then handling the anomaly.

For example, the predetermined information includes a number of times the anomaly is detected in the detecting, and the switching includes determining, as the switched transmission timing, a transmission timing according to the number of times the anomaly is detected.

Thus, the switched transmission timing can be determined dynamically according to the number of errors. The number of errors can be synchronized between the ECUs on the transmitting and receiving sides.

For example, the predetermined information includes information indicating a transmission time of the frame in which the anomaly is detected, and the switching includes determining, as the switched transmission timing, a transmission timing according to the information indicating the transmission time.

Thus, the switched transmission timing can be determined dynamically according to the information indicating the transmission time. The information indicating the transmission time can be synchronized between the ECUs on the transmitting and receiving sides.

For example, the switching includes calculating a hash value of the number of times the anomaly is detected, calculating a remainder of the hash value using a number of bits of a payload segment of the frame in which the anomaly is detected, and determining, as the switched transmission timing, a transmission timing according to the remainder. For example, the switching includes generating a pseudorandom number using the information indicating the transmission time as a seed, calculating a remainder of the pseudorandom number using a number of bits of a payload segment of the frame in which the anomaly is detected, and determining, as the switched transmission timing, a transmission timing according to the remainder.

This makes it more difficult for the attacker to predict the switched transmission timing, so that the security of the in-vehicle network can be improved. The calculated remainder value is less than the number of bits. For example, in the case where the in-vehicle network is based on FlexRay, an increase of the number of switched slots can be suppressed, with it being possible to prevent exhaustion of slot IDs.

For example, the switching further includes performing a bit shift operation process on a bit string forming the payload segment by a bit shift amount according to the remainder.

Thus, the receiving-side ECU can easily determine whether the received frame is an anomalous frame. For example, even in the case where the attacker can predict the transmission timing (e.g. slot ID) after switching, if the attacker does not know the rule of bit shift, the decoded value obtained by decoding the data frame of the anomalous frame by the receiving-side ECU will end up being an abnormal numerical value. Hence, by checking the decoded value, the receiving-side ECU can easily determine whether the received frame is an anomalous frame.

For example, the predetermined information includes a risk of the frame in which the anomaly is detected, and the switching includes determining, as the switched transmission timing, a transmission timing according to the risk.

Thus, the switched transmission timing can be determined dynamically according to the risk. The risk can be synchronized between the ECUs on the transmitting and receiving sides.

For example, the switching is performed when the risk is greater than or equal to a first threshold.

Thus, while suppressing an increase of the throughput in the ECU, correct information of a frame with a high risk can be transmitted to another ECU.

For example, the switching further includes performing, when the risk is greater than or equal to the first threshold, a bit shift operation process on a bit string forming a payload segment of the frame in which the anomaly is detected, by a bit shift amount according to the risk.

Thus, the receiving-side ECU can easily determine whether the received frame is an anomalous frame.

For example, the switching includes performing the bit shift operation process on the bit string forming the payload segment by the bit shift amount according to the risk, when the risk is greater than or equal to a second threshold and less than the first threshold, the second threshold being lower than the first threshold.

Thus, while suppressing an increase of the throughput in the ECU, the receiving-side ECU can easily determine whether the received frame is an anomalous frame.

For example, the switching includes determining, as the switched transmission timing, a plurality of transmission timings according to the risk, when the risk is greater than or equal to a third threshold that is higher than the first threshold.

This makes it more difficult to predict the switched transmission timing.

For example, the predetermined information includes a vehicle state, and the switching includes determining, as the switched transmission timing, a transmission timing according to the vehicle state.

Thus, the switched transmission timing can be determined dynamically according to the vehicle state. The vehicle state can be synchronized between the ECUs on the transmitting and receiving sides.

For example, the switching is performed when a number of times the anomaly is detected in the detecting is greater than or equal to a predetermined number. For example, the switching is performed when an elapsed time from when the anomaly is detected last time is less than or equal to a predetermined time.

Thus, the transmission timing switching process is performed when an anomalous state continues. Consequently, the secure state in the vehicle can be maintained effectively.

For example, the switching includes, after the frame in which the anomaly is detected is transmitted at the transmission timing of the frame, switching the transmission timing of the frame.

Thus, the same frame can be transmitted a plurality of times. The receiving-side ECU can determine whether at least one frame of the plurality of frames is an anomalous frame, based on the difference between the plurality of frames.

For example, a communication scheme in the in-vehicle network is a time trigger-type communication scheme based on time slots, the transmitting and receiving includes transmitting and receiving the frame in a predetermined time slot, and the switching includes determining a switched slot to which the transmission timing is switched, as the switched transmission timing.

Thus, in the case where the communication scheme of the in-vehicle network system is FlexRay, the secure state of the in-vehicle network system as a whole can be maintained.

For example, the time slots include a plurality of empty slots to each of which no frame is assigned, and the switching includes determining, as the switched slot, an empty slot according to the predetermined information.

Thus, the secure state of the in-vehicle network system as a whole can be maintained without affecting transmission of other frames.

An anomaly handling device according to an aspect of the present disclosure is an anomaly handling device in an in-vehicle network, the anomaly handling device including: a frame transmitter/receiver that transmits and receives frames; an anomaly detector that detects a frame having an anomaly; and a switching processor that switches, when the anomaly is detected by the anomaly detector, a transmission timing of the frame in which the anomaly is detected, wherein the switching processor changes a switched transmission timing to which the transmission timing is switched, according to predetermined information.

Thus, the same effects as the anomaly handling method described above can be achieved.

An anomaly handling method, etc. according to embodiments of the present disclosure will be described below, with reference to the drawings. The embodiments described below each show a preferable specific example of the present disclosure. The numerical values, shapes, materials, structural elements, the arrangement and connection of the structural elements, steps, the processing order of the steps etc. shown in the following embodiments are mere examples of the present disclosure, and do not limit the scope of the present disclosure. The present disclosure is defined based on the scope of the claims. Of the structural elements in the embodiments described below, the structural elements not recited in any one of the independent claims representing the broadest concepts are not necessarily required in order to achieve the object of the present disclosure but are described as structural elements constituting preferable embodiments.

Each drawing is a schematic and does not necessarily provide precise depiction. For example, scale and the like are not necessarily consistent throughout the drawings. The substantially same structural elements are given the same reference marks throughout the drawings, and repeated description is omitted or simplified.

Embodiment 1

[1. Structure of System]

In-vehicle network system 10 will be described below as an embodiment of the present disclosure, with reference to the drawings.

[1-1. Overall Structure of in-Vehicle Network System 10]

FIG. 1 is a diagram illustrating an overall structure of in-vehicle network system 10 in Embodiment 1. In-vehicle network system 10 includes: FlexRay buses 100a, 100b, 100c, and 100d; ECUs 200a, 200b, 200c, and 200d connected to the respective buses; front camera 210, gear 220, brake 230, and rear camera 240 to be controlled by the respective ECUs; and star coupler 300 connecting the FlexRay buses. ECUs 200a to 200d achieve vehicle control by transmitting and receiving frames via the FlexRay buses. Star coupler 300 performs signal reshaping so that the same signal flows in all FlexRay buses 100a, 100b, 100c, and 100d, and the ECUs synchronize through the FlexRay buses.

[1-2. FlexRay Cycle]

Figure 2:
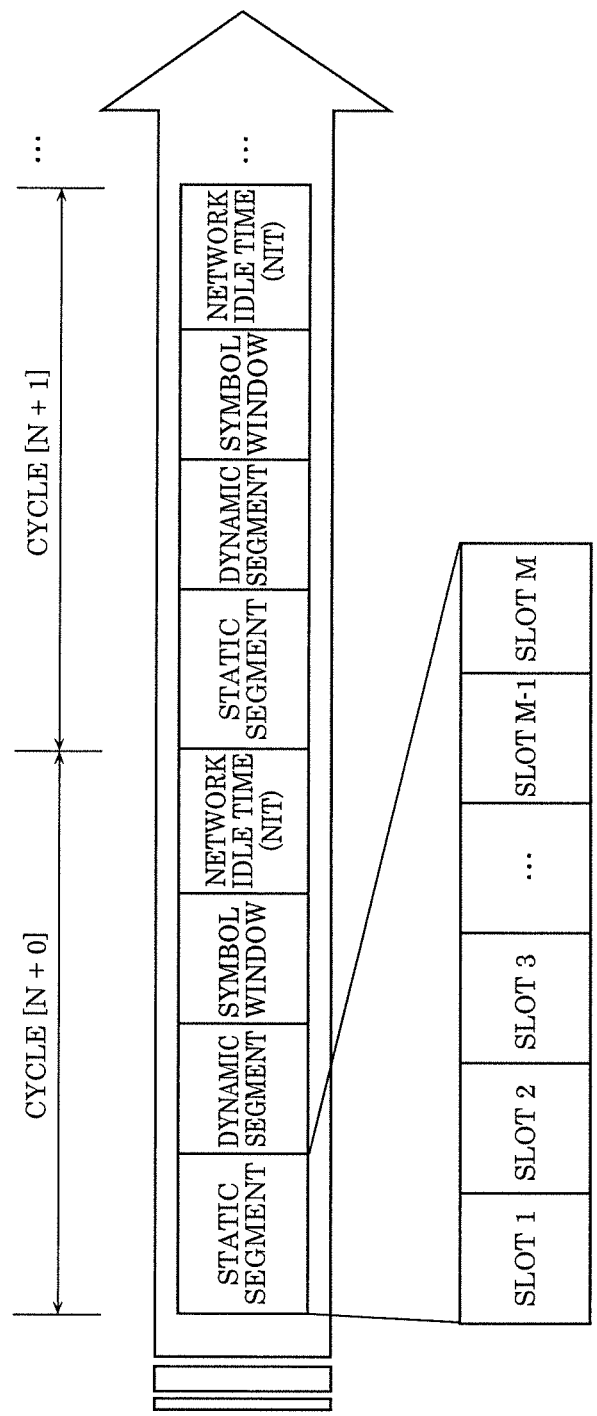
FIG. 2 is a diagram illustrating cycles of FlexRay communication in Embodiment 1.

FIG. 2 is a diagram illustrating cycles of FlexRay communication in Embodiment 1. FlexRay communication is performed in a unit called a cycle. Each node synchronously holds the number of cycles repeated (cycle counter), and the cycle counter takes a value of 0 to 63. At a cycle after the cycle counter is 63, the cycle counter is reset to 0.

Each cycle is composed of four segments, namely, "static segment", "dynamic segment", "symbol window", and "network idle time (NIT)". The time of each segment is common to the whole FlexRay network (cluster) according to a parameter designed beforehand, and therefore the time of one cycle is equally common to the cluster.

The static segment is composed of a plurality of slots. The number of slots and the time of each slot are common to the cluster. One FlexRay frame is transmitted in one slot, and the slot number serves as the identifier of the frame (frame ID). Each ECU is designed to transmit a frame at a predetermined timing (slot number). Each frame transmitted in the static segment is called a static frame. The payload length of the static frame is common to the cluster.

The dynamic segment is composed of slots called minislots. The minislots equally have slot numbers, and each ECU is designed to perform transmission at a predetermined timing (slot number). Unlike the static segment, however, frame transmission need not necessarily be performed. Each frame transmitted in the dynamic segment is called a dynamic frame. The payload length of the dynamic frame may be any value of 0 to 254.

The symbol window is a period of time in which a signal called a symbol is transmitted and received.

The network idle time is a period of time in which no communication is performed, and is provided at the end of every cycle. Each ECU performs temporal synchronization and the like.

[1-3. Frame Format]

Figure 3:
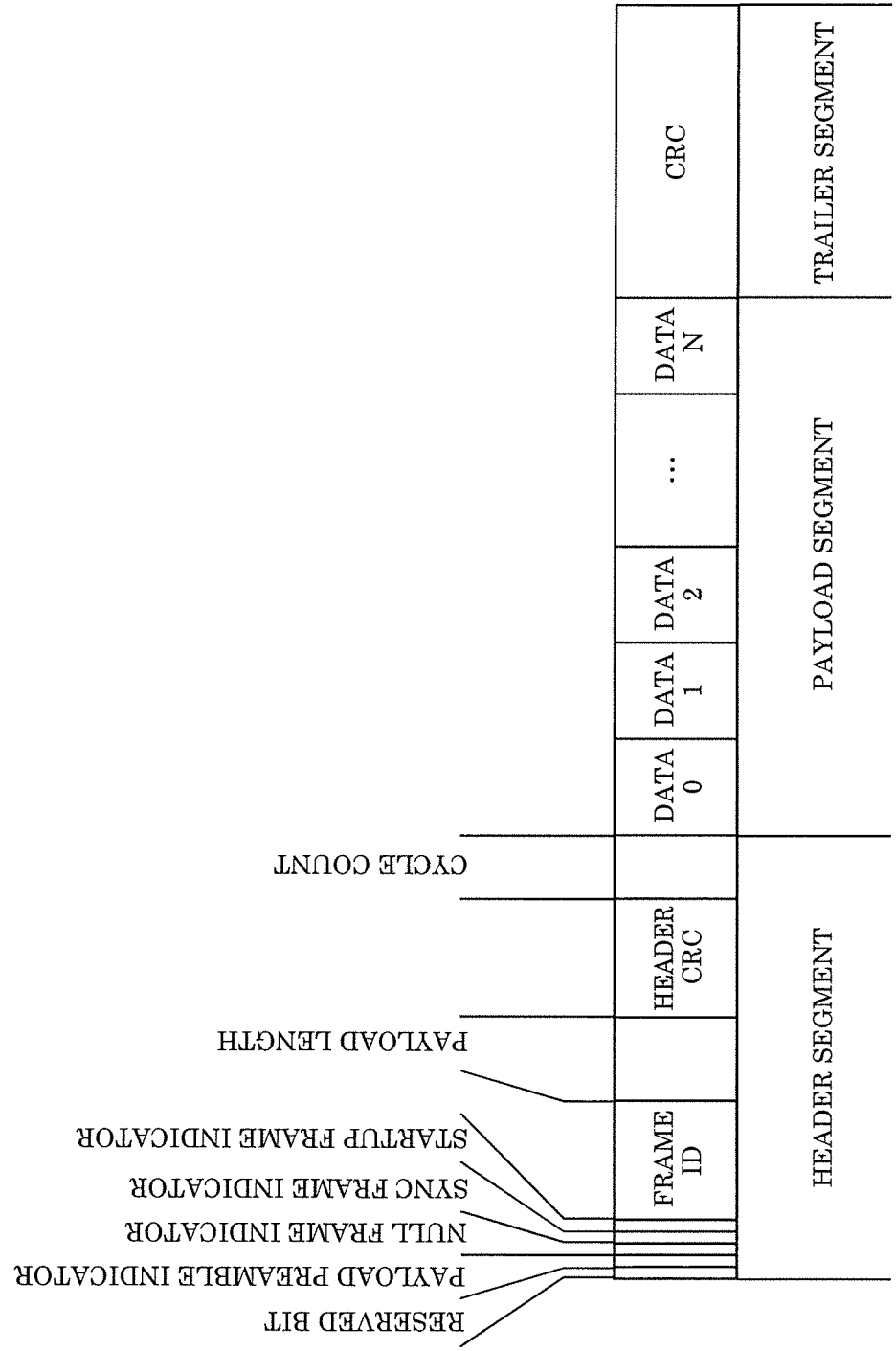
FIG. 3 is a diagram illustrating a frame format of FlexRay communication in Embodiment 1.

FIG. 3 is a diagram illustrating a frame format of FlexRay communication in Embodiment 1. Specifically, FIG. 3 is a diagram illustrating a frame format of a FlexRay protocol. A frame includes three segments, namely, "header segment", "payload segment", and "trailer segment".

The header segment starts with a reserved bit, and includes a payload preamble indicator, a null frame indicator, a sync frame indicator, and a startup frame indicator for representing the type of the frame, which are 1 bit each. The header segment further includes a frame ID of 11 bits, a payload length of 7 bits, a header CRC of 11 bits, and a cycle count of 6 bits. The frame ID is also referred to as a slot ID, and is used to identify the transmission timing of the frame and the contents of the frame. The payload length can take a value of 127 at a maximum. The number of bytes obtained by multiplying the value of the payload length by 2 is stored in the payload segment. The header CRC is a checksum calculated from values including the sync frame indicator to the payload length. The cycle count stores the current number of cycles. The number of cycles is an example of information indicating a transmission time.

The payload segment includes data representing the contents of the frame. The payload segment stores the number of bytes obtained by multiplying the value of the payload length by 2. The payload segment stores 254 bytes at a maximum.

The trailer segment stores a CRC calculated from values including the whole frame.

[1-4. Structure of ECU 200a]

Figure 4:
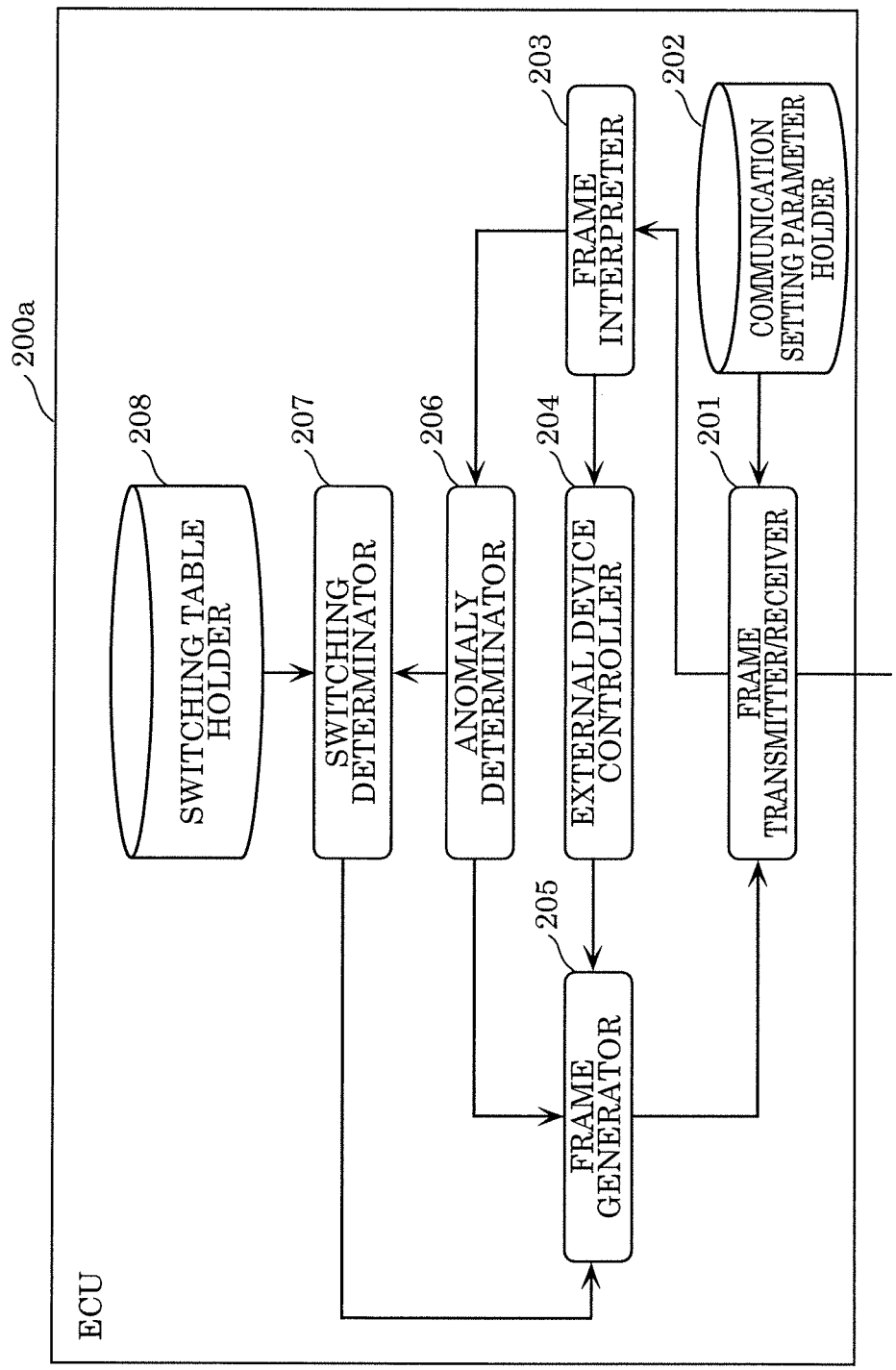
FIG. 4 is a diagram illustrating an example of a structure of an ECU in Embodiment 1.

FIG. 4 is a diagram illustrating an example of a structure of ECU 200a in Embodiment 1. ECUs 200b, 200c, and 200d have the same structure as ECU 200a, and accordingly their description is omitted here.

ECU 200a includes frame transmitter/receiver 201, communication setting parameter holder 202, frame interpreter 203, external device controller 204, frame generator 205, anomaly determinator 206, switching determinator 207, and switching table holder 208.

Frame transmitter/receiver 201 decodes a physical signal received from bus 100a to a digital signal, to obtain information of a frame. Frame transmitter/receiver 201 temporally synchronizes with the other ECUs by referencing to communication setting parameters held in communication setting parameter holder 202, and thus can correctly receive a frame. Frame transmitter/receiver 201 also converts a frame to a physical signal and transmits it to bus 100a at a predetermined timing, in response to a frame transmission request notified from frame generator 205.

Communication setting parameter holder 202 holds parameters that are common to the cluster and are used to correctly convert a physical signal to a digital signal. FIG. 5 illustrates an example of the communication setting parameters held in communication setting parameter holder 202 (described in detail later).

Frame interpreter 203 interprets the payload included in the received frame notified from frame transmitter/receiver 201, and notifies external device controller 204 according to the contents of the payload in order to control front camera 210 connected to ECU 200a. For example, frame interpreter 203 determines the driving state based on information of the speed of the vehicle notified from another ECU, and adjusts the camera photographing details according to the driving state. Frame interpreter 203 also notifies anomaly determinator 206 of the received contents of the frame such as ID and payload.

External device controller 204 controls front camera 210 connected to ECU 200a. External device controller 204 also notifies frame generator 205 of a frame transmission request for notifying another ECU of the state, according to notification from front camera 210. For example, whether there is a pedestrian ahead is notified.

Frame generator 205 generates a frame based on the notified signal, and requests frame transmitter/receiver 201 to transmit the frame.

Anomaly determinator 206 determines whether the received frame is anomalous, based on the received contents such as ID and payload notified from frame interpreter 203. In this embodiment, in the case where an error such as a syntax error is received with the same ID, the received frame is determined as anomalous. In the case where anomaly determinator 206 determines that the received frame is anomalous, anomaly determinator 206 notifies switching determinator 207 and frame generator 205 that the received frame is anomalous. Anomaly determinator 206 is an example of an anomaly detector.

Switching determinator 207 references to the switching table notified from switching table holder 208 and notifies frame generator 205 to change the transmission contents, based on the determination result notified from anomaly determinator 206.

Switching table holder 208 holds the switching table necessary to switch the transmission contents according to the anomaly detection result.

[1-5. Example of Communication Setting Parameter]

FIG. 5 is a diagram illustrating an example of communication setting parameters of FlexRay communication in Embodiment 1. The communication setting parameters illustrated in FIG. 5 are stored in communication setting parameter holder 202. In the communication setting parameters in the example in FIG. 5, the baud rate representing the communication speed is 10 Mbps, the static segment slot ID is 1 to 50, and the dynamic segment slot ID is 51 to 100. Moreover, the static slot payload length is 8 (i.e. 16 bytes). These values are shared by all ECUs in the cluster, and transmission and reception of FlexRay frames is achieved based on these values. The values of the communication setting parameters are merely an example, and the communication setting parameters may have other values. The parameters illustrated in FIG. 5 are merely an example, and one or more parameters not illustrated in FIG. 5 (e.g. the length of each segment, the slot length, etc.) may be added, or one or more parameters illustrated in FIG. 5 may be omitted.

[1-6. Structure of Star Coupler 300]

Figure 6:
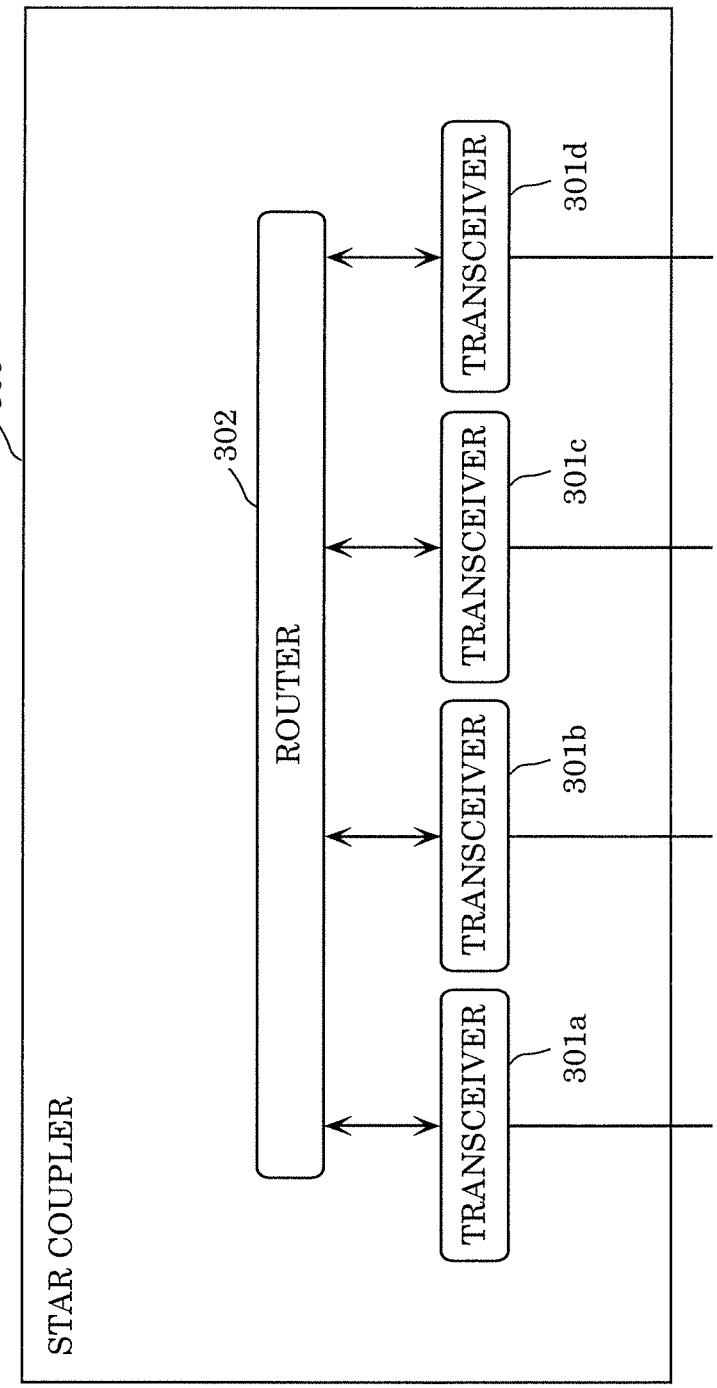
FIG. 6 is a diagram illustrating an example of a structure of a star coupler in Embodiment 1.

FIG. 6 is a diagram illustrating an example of a structure of star coupler 300 in Embodiment 1. Star coupler 300 includes transceivers 301a, 301b, 301c, and 301d, and router 302. Transceivers 301b, 301c, and 301d have the same structure as transceiver 301a, and accordingly their description is omitted here.

Transceiver 301a converts a physical signal received from bus 100a to a digital signal, and notifies router 302 of the digital signal. In the case of being notified of a digital signal from router 302, transceiver 301a converts the notified digital signal to a physical signal and transfers the physical signal to bus 100a.

Router 302 transfers a digital signal notified from transceiver 301a, to transceivers 301b, 301c, and 301d other than transceiver 301a. Likewise, in the case of being notified of a digital signal from transceiver 301b, router 302 notifies the transceivers other than transceiver 301b of the digital signal. In the case of receiving digital signals from a plurality of transceivers, router 302 notifies the other transceivers of the digital signal from the bus from which the digital signal is received first.

[1-7. Example of Frame List]

FIG. 7 is a diagram illustrating an example of a frame list transmitted in FlexRay communication in Embodiment 1. FIG. 7 illustrates an example of a frame list transmitted and received by ECU 200a.

In FIG. 7, the frame list holds the following items: slot ID, cycle offset, cycle reception, frame name, and payload information included in the frame. The cycle offset and the cycle reception are information necessary to extract a target frame when cycle multiplexing is used. Cycle multiplexing is a method of transmitting/receiving frames of different contents with the same slot ID. For example, there are two frame names for a frame whose slot ID is 98, and different information, i.e. front camera information 1 and front camera information 2, are notified by the respective frames. In front camera information 1, the cycle offset is 0, and the cycle reception is 2. This means that the cycle counter starts with 0 and the frame is transmitted per two cycles. That is, frame C including front camera information 1 is transmitted when the slot ID is 98 in the cycle counter of 0, 2, 4, 6, . . . , 58, 60, and 62. Frame D including front camera information 2 is transmitted when the slot ID is 98 in the cycle counter of 1, 3, 5, . . . , 59, 61, and 63. Such a method of transmitting different frames by the same slot ID is referred to as cycle multiplexing. Likewise, there are two frame names for a frame whose slot ID is 99, and different information, i.e. rear camera information 1 and rear camera information 2, are notified by the respective frames. Frame E including rear camera information 1 is transmitted when the slot ID is 99 in the cycle counter of 0, 2, 4, . . . , 58, 60, and 62. Frame F including rear camera information 2 is transmitted when the slot ID is 99 in the cycle counter of 1, 3, 5, . . . , 59, 61, and 63.

In FIG. 7, a frame whose slot ID is 1, cycle offset is 0, and cycle reception is 1 (i.e. the same frame is transmitted in all cycles) has a frame name "A", and the payload of frame A includes information about speed. When the slot ID is 2, no frame is transmitted. A frame whose slot ID is 3, cycle offset is 0, and cycle reception is 2 (i.e. transmitted only when the cycle counter is an even number) has a frame name "B", and the payload of frame B includes information about gear state. A frame whose slot ID is 98, cycle offset is 0, and cycle reception is 2 has a frame name "C", and the payload of frame C includes information about front camera information 1. A frame whose slot ID is 98, cycle offset is 1, and cycle reception is 2 has a frame name "D", and the payload of frame D includes information about front camera information 2. A frame whose slot ID is 99, cycle offset is 0, and cycle reception is 2 has a frame name "E", and the payload of frame E includes information about rear camera information 1. A frame whose slot ID is 99, cycle offset is 1, and cycle reception is 2 has a frame name "F", and the payload of frame F includes information about rear camera information 2. Frames A and B are static frames transmitted in the static segment, and frames C to F are dynamic frames transmitted in the dynamic segment.

FIG. 8 is a diagram illustrating an example of a frame transmission schedule of FlexRay communication in Embodiment 1. FIG. 8 illustrates a frame transmission schedule in the example of the frame list in FIG. 7. The horizontal axis represents the slot ID, and the vertical axis represents the cycle. A frame name subjected to transmission is designated in each cell defined by a slot ID and a cycle. In FIG. 8, frames C to F are transmitted in predetermined cycles, but these frames are dynamic frames and therefore may not be transmitted in some cases.

[1-8. Example of Switching Table]

FIG. 9 is a diagram illustrating an example of the switching table in Embodiment 1. In this embodiment, in the case where an anomaly occurs in frames whose IDs are 1, 3, 98, and 99, the respective IDs are switched to 97, 100, 99, and 98.

[1-9. Example of Switching Communication Sequence]

Figure 10:
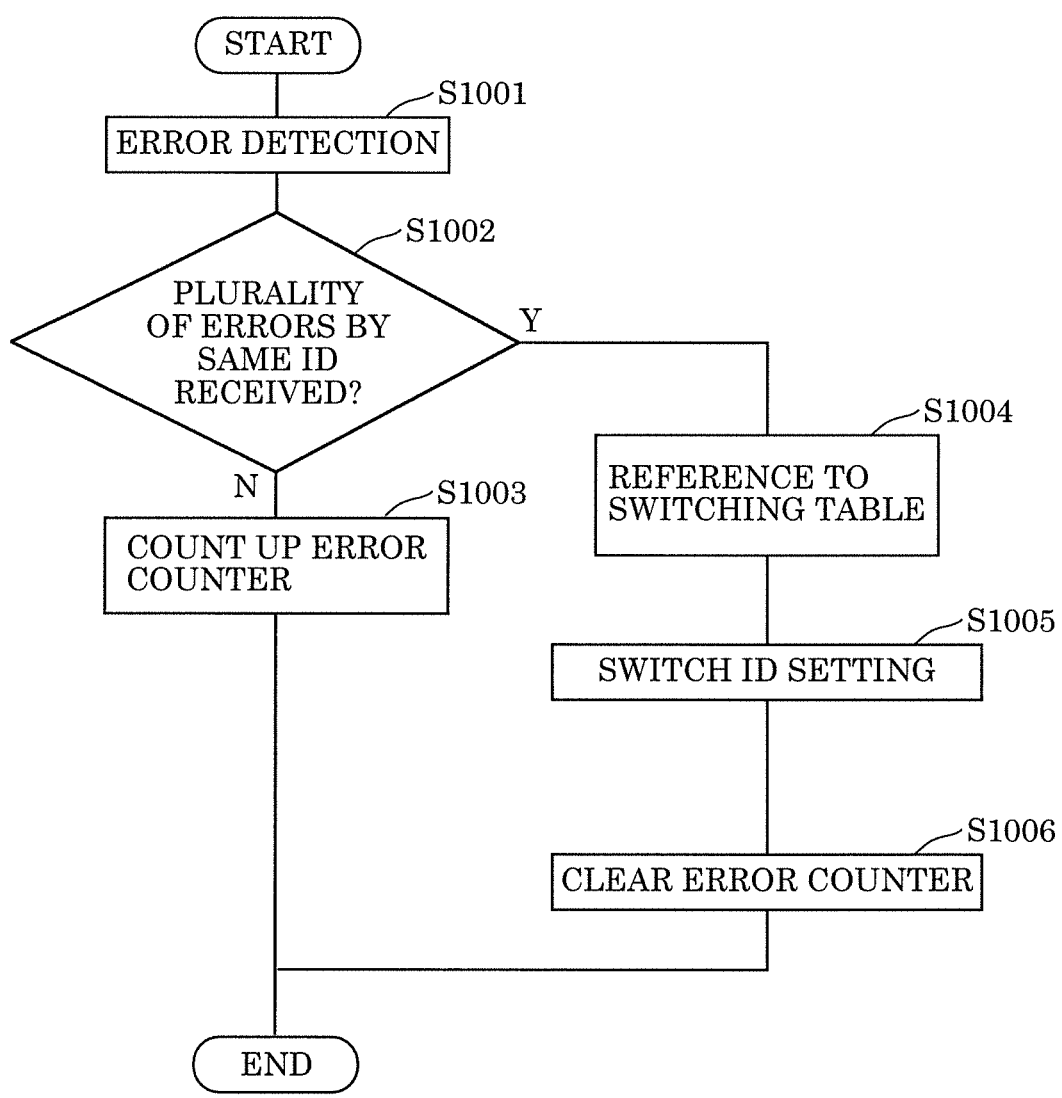
FIG. 10 is a diagram illustrating an example of a switching communication sequence in Embodiment 1.

FIG. 10 is a diagram illustrating an example of a switching communication sequence in Embodiment 1. FIG. 10 illustrates an example of a sequence in which ECU 200a detects an anomaly and performs switching.

(S1001) ECU 200a detects whether there is an error in FlexRay.

(S1002) Based on a counter for determining whether the error is by the same ID, ECU 200a determines whether a plurality of errors by the same ID occur.

(S1003) ECU 200a counts up the error counter of the target ID.

(S1004) ECU 200a references to the switching table, and finds a switching process corresponding to the target ID.

(S1005) ECU 200a switches ID setting.

(S1006) ECU 200a clears the error counter of the target ID.

[1-10. Effects of Embodiment 1]

With the anomaly handling method in Embodiment 1, an ECU detecting an anomaly dynamically changes the transmission slot of a frame to be transmitted, using the switching table. Thus, communication jamming by an anomalous frame can be avoided, and normal communication can be maintained. Moreover, by effective use of a communication slot saved beforehand, a frame can be transmitted without increasing communications traffic.

Embodiment 2

[2. Structure of System]

In-vehicle network system 20 will be described below as an embodiment of the present disclosure, with reference to the drawings.

[2-1. Overall Structure of in-Vehicle Network System 20]

Figure 11:
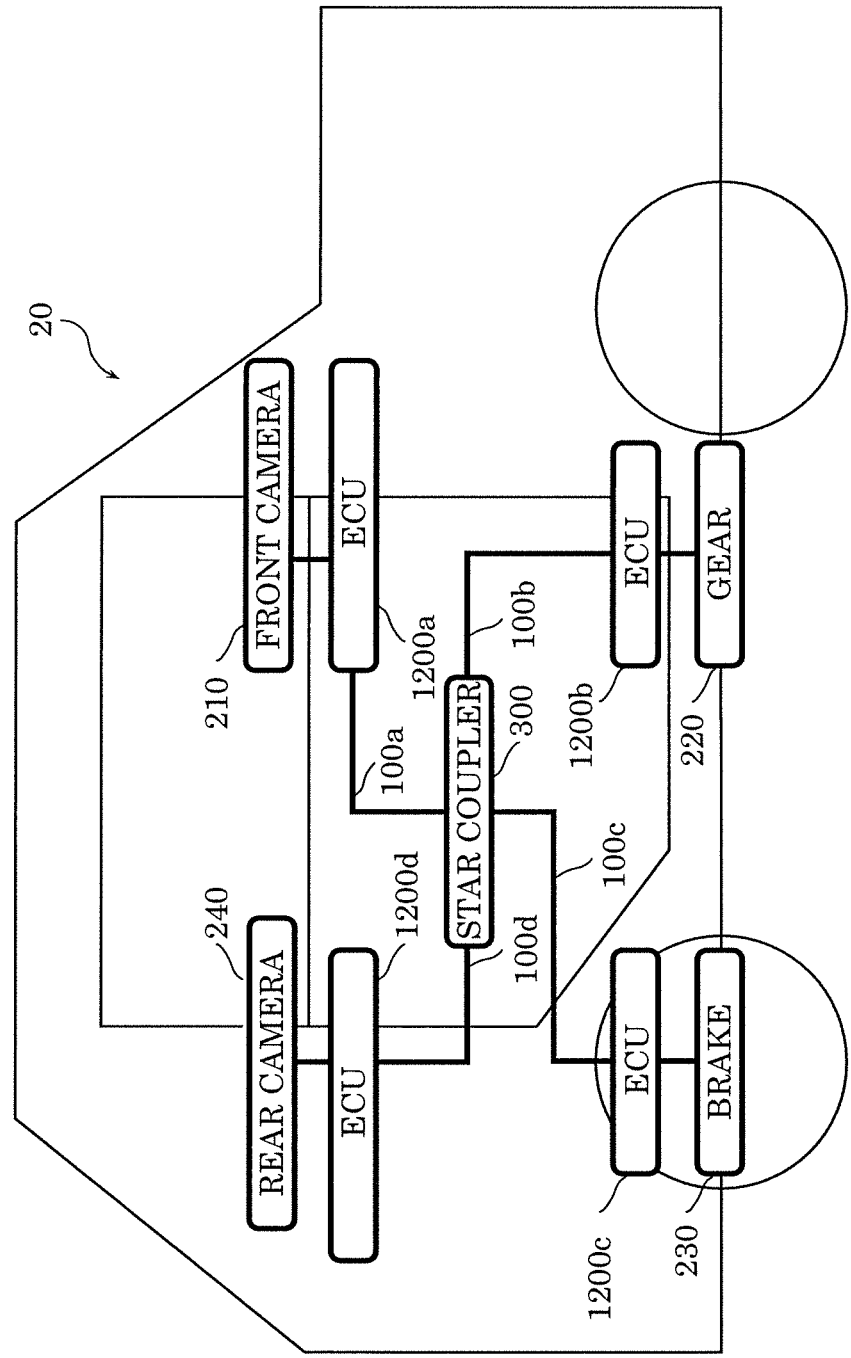
FIG. 11 is a diagram illustrating an overall structure of an in-vehicle network system in Embodiment 2.

FIG. 11 is a diagram illustrating an overall structure of in-vehicle network system 20 in Embodiment 2. In-vehicle network system 20 includes: FlexRay buses 100a, 100b, 100c, and 100d; ECUs 1200a, 1200b, 1200c, and 1200d connected to the respective buses; front camera 210, gear 220, brake 230, and rear camera 240 to be controlled by the respective ECUs; and star coupler 300 connecting the FlexRay buses. The same structural elements as in Embodiment 1 are given the same numerals, and their description is omitted.

[2-2. Structure of ECU 1200a]

Figure 12:
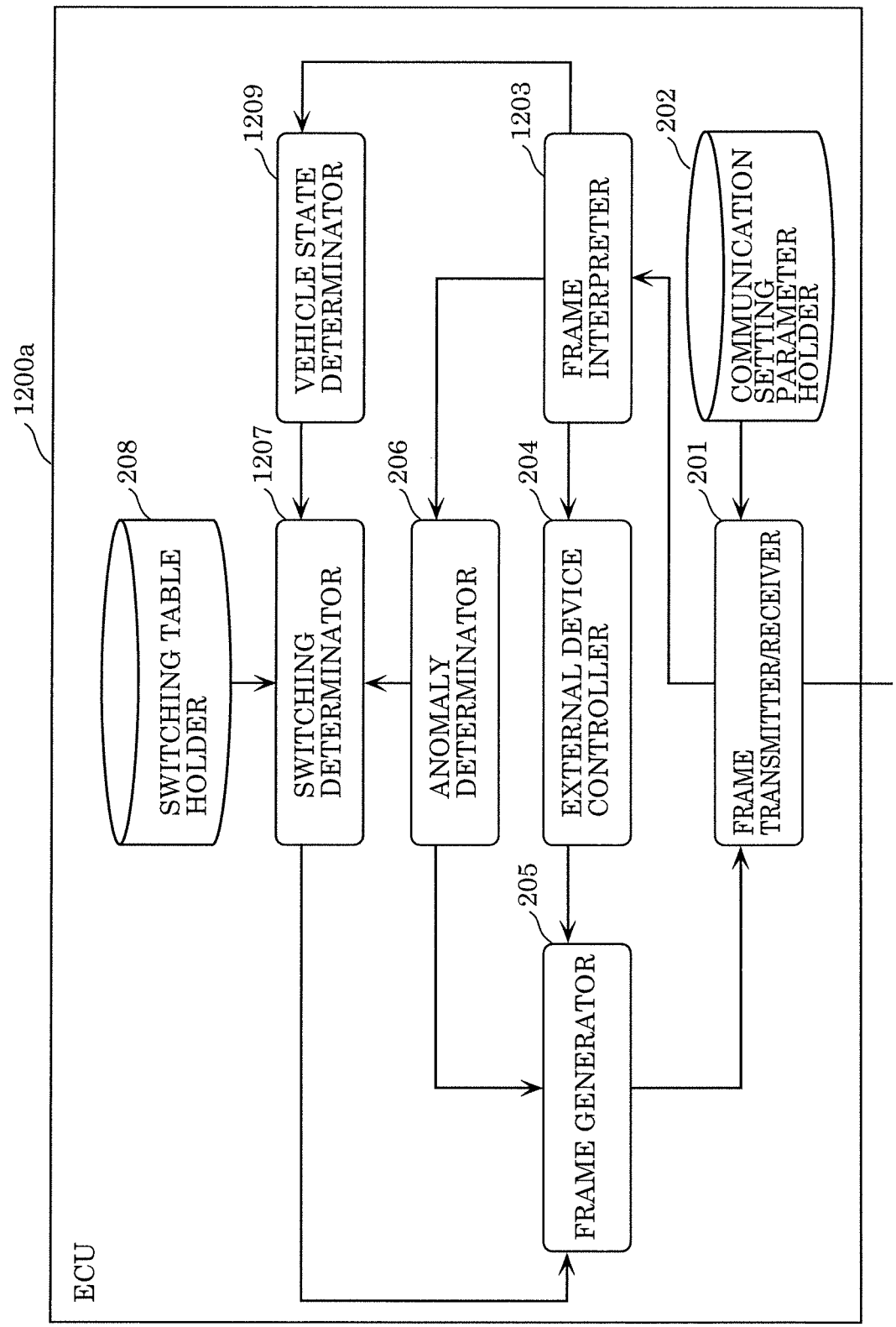
FIG. 12 is a diagram illustrating an example of a structure of an ECU in Embodiment 2.

FIG. 12 is a diagram illustrating an example of a structure of ECU 1200a in Embodiment 2. ECUs 1200b, 1200c, and 1200d have the same structure as ECU 1200a, and accordingly their description is omitted here.

ECU 1200a includes frame transmitter/receiver 201, communication setting parameter holder 202, frame interpreter 1203, external device controller 204, frame generator 205, anomaly determinator 206, switching determinator 1207, switching table holder 208, and vehicle state determinator 1209. The same structural elements as in Embodiment 1 are given the same numerals, and their description is omitted.

Frame interpreter 1203 interprets the payload included in the received frame notified from frame transmitter/receiver 201, and notifies external device controller 204 according to the contents of the payload in order to control front camera 210 connected to ECU 1200a. For example, frame interpreter 1203 determines the driving state based on information of the speed of the vehicle notified from another ECU, and adjusts the camera photographing details according to the driving state. Frame interpreter 1203 also notifies anomaly determinator 206 and vehicle state determinator 1209 of the received contents of the frame such as ID and payload.

Switching determinator 1207 references to the switching table notified from switching table holder 208 and notifies frame generator 205 to change the transmission contents, based on the determination result notified from anomaly determinator 206 and the vehicle state notified from vehicle state determinator 1209.

Vehicle state determinator 1209 determines the current state of the vehicle, based on the received contents such as ID and payload notified from frame interpreter 1203. For example, vehicle state determinator 1209 may receive a frame including, as a payload, a result of determination by another ECU, or vehicle state determinator 1209 in each ECU may perform determination based on information of speed, gear, etc.

[2-3. Example of Switching Table]

FIG. 13 is a diagram illustrating an example of the switching table in Embodiment 2. In this embodiment, IDs 1 and 3 are respectively switched to IDs 97 and 100, regardless of the state of the vehicle. Moreover, IDs 98 and 99 are respectively switched to IDs 99 and 98, only in the case where the state of the vehicle is driving.

[2-4. Example of Switching Communication Sequence]

Figure 14:
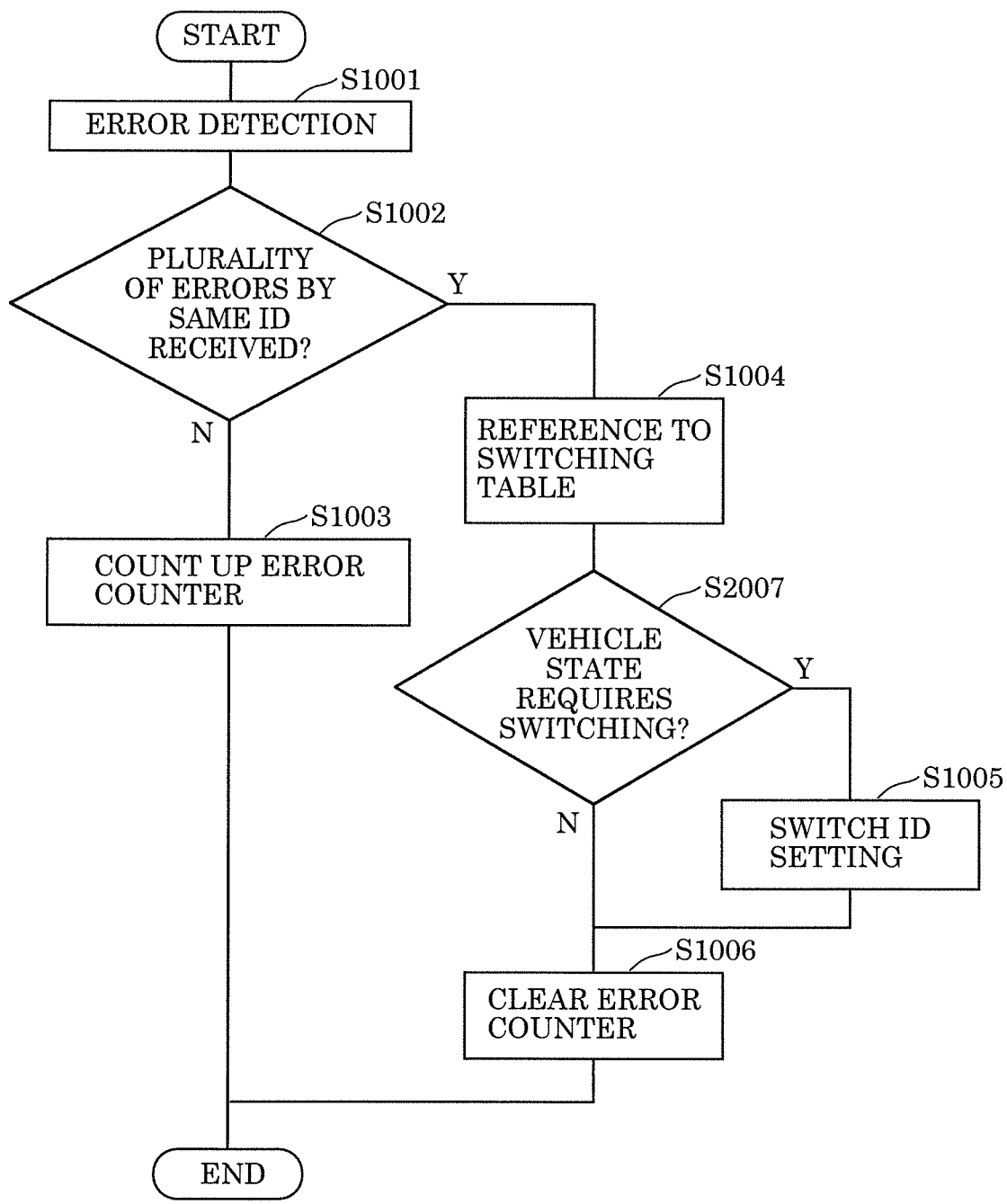
FIG. 14 is a diagram illustrating an example of a switching communication sequence in Embodiment 2.

FIG. 14 is a diagram illustrating an example of a switching communication sequence in Embodiment 2. FIG. 14 illustrates an example of a sequence in which ECU 1200a detects an anomaly and performs switching. The same process steps as in FIG. 10 are given the same numerals, and their description is omitted.

(S2007) ECU 1200a compares the current vehicle state and the switching table, and determines whether the target ID needs to be switched. That is, ECU 1200a determines whether the current vehicle state is a vehicle state that requires switching. In the case where ECU 1200a determines that the current vehicle state is a vehicle state that requires switching (S2007: Yes), ECU 1200a advances to Step S1005. In the case where ECU 1200a determines that the current vehicle state is not a vehicle state that requires switching (S2007: No), ECU 1200a advances to Step S1006.

[2-5. Effects of Embodiment 2]

With the anomaly handling method in Embodiment 2, an ECU detecting an anomaly dynamically changes the transmission slot of a frame to be transmitted, using the switching table corresponding to a specific vehicle state. Thus, communication jamming by an anomalous frame can be avoided, and normal communication can be maintained. Moreover, by effective use of a communication slot saved beforehand, a frame can be transmitted without increasing communications traffic. In addition, limiting the vehicle state to a specific vehicle state minimizes the change from communication in normal time, and thus normal communication can be maintained.

(Effects of Embodiments 1 and 2, etc.)

An anomaly handling method according to an aspect of the present disclosure is an anomaly handling method in an in-vehicle network which is a time trigger-type communication scheme based on time slots, wherein one or more electronic control devices (e.g. ECU 200a) are connected to in-vehicle network system 10 or 20, and each electronic control device transmits and receives a frame in a predetermined time slot set beforehand. An anomaly handling method of an electronic control device includes: transmitting and receiving frames; detecting a frame having an anomaly (e.g. S1001); and performing a process of switching a transmission frame according to predetermined setting based on a determination result in the detecting, when a predetermined condition is satisfied (e.g. S1005).

Thus, when an anomalous frame is detected, the secure state of in-vehicle network system 10 or 20 as a whole can be maintained by switching.

In the anomaly handling method according to an aspect of the present disclosure, for example, the detecting includes determining an anomaly of a frame according to a predetermined attack determination algorithm.

Thus, the secure state of in-vehicle network system 10 or 20 as a whole can be maintained even in the case where the in-vehicle network is under a cybersecurity attack.

In the anomaly handling method according to an aspect of the present disclosure, any one of a static slot and a dynamic slot is designated as a slot from which the transmission frame is switched, as the predetermined setting.

Thus, even when a specific slot is anomalous, a failure to transmit the frame of the slot can be prevented.

In the anomaly handling method according to an aspect of the present disclosure, for example, any one of a static slot and a dynamic slot is designated as a slot to which the transmission frame is switched, as the predetermined setting.

Thus, even when a specific slot is anomalous, a failure to transmit the frame of the slot can be prevented.

In the anomaly handling method according to an aspect of the present disclosure, for example, an empty slot to which a frame is not assigned yet is designated as a slot to which the transmission frame is switched, as the predetermined setting.

Thus, communication can be performed without an increase in overall communication time.

In the anomaly handling method according to an aspect of the present disclosure, for example, a slot to which a frame is already assigned is designated as a slot to which the transmission frame is switched, as the predetermined setting.

Thus, communication can be performed without an increase in overall communication time, even in the case of communication specifications that provide no empty slot.

In the anomaly handling method according to an aspect of the present disclosure, for example, a payload of the already assigned frame and a payload of the switched frame are combined, as the predetermined setting.

Thus, communication can be performed without an increase in overall communication time.

In the anomaly handling method according to an aspect of the present disclosure, for example, a new slot is added as a slot to which the transmission frame is switched, as the predetermined setting.

Thus, communication can be performed regardless of communication specifications in normal time.

In the anomaly handling method according to an aspect of the present disclosure, for example, a payload of the already assigned frame and a payload of the switched frame are replaced with each other, as the predetermined setting.

Thus, merely by transmitting and receiving a specific payload, it is possible to transmit and receive information that requires transmission and reception of frames of a plurality of slots in normal time.

In the anomaly handling method according to an aspect of the present disclosure, for example, the switching process is performed as a result of detecting an error according to the communication scheme, as the predetermined condition.

Thus, the switching process can be performed with no need to additionally prepare a frame for notification.

In the anomaly handling method according to an aspect of the present disclosure, for example, the switching process is performed as a result of detecting a frame other than the frame having an anomaly, as the predetermined condition.

Thus, the switching process can be performed regardless of the network protocol.

In the anomaly handling method according to an aspect of the present disclosure, for example, the switching process is performed according to a state of a vehicle including the in-vehicle network set beforehand, as the predetermined condition.

Thus, an appropriate switching process can be prescribed according to the vehicle state, with it being possible to reduce the difference from normal time.

In the anomaly handling method according to an aspect of the present disclosure, the state of the vehicle is any one of parked, stopped, and driving.

Thus, an appropriate switching process can be prescribed according to the state such as parked, stopped, or driving, with it being possible to reduce the difference from normal time.

A communication system is a communication system in an in-vehicle network which is a time trigger-type communication scheme based on time slots, wherein one or more electronic control devices are connected to the in-vehicle network, and each electronic control device transmits and receives a frame in a predetermined time slot set beforehand. The electronic control device: transmits and receives frames; detects a frame having an anomaly; and performs a process of switching a transmission frame according to predetermined setting based on a determination result in the detection, when a predetermined condition is satisfied.

Thus, when an anomalous frame is detected, the secure state of the in-vehicle network system as a whole can be maintained by switching.

An electronic control device is an electronic control device of one or more electronic control devices that are, in a communication system in an in-vehicle network which is a time trigger-type communication scheme based on time slots, connected to the in-vehicle network, wherein each electronic control device transmits and receives a frame in a predetermined time slot set beforehand. The electronic control device includes: frame transmitter/receiver 201 that transmits and receives frames; anomaly determinator 206 that detects a frame having an anomaly; and switching determinator 207 that performs a process of switching a transmission frame according to predetermined setting based on a determination result in the detection, when a predetermined condition is satisfied.

Thus, when an anomalous frame is detected, the secure state of the in-vehicle network system as a whole can be maintained by switching.

Embodiment 3

[3-1. Structure of System]

This embodiment describes the case where, when switching the slot ID of a frame in which an anomaly is detected, the switched slot ID to which the slot ID is switched changes dynamically. Specifically, this embodiment describes the case where the switched slot ID to which the slot ID in which an anomaly is detected is switched changes dynamically based on the number of times an anomaly is detected (the number of errors). For example, the number of errors is the number of times an anomaly is detected for the same slot ID.

An in-vehicle network system according to this embodiment has the same structure as in-vehicle network system 10 according to Embodiment 1 or in-vehicle network system 20 according to Embodiment, and accordingly its description is omitted here. An example in which the in-vehicle network according to this embodiment has the same structure as in-vehicle network system 10 according to Embodiment 1 will be described below.

Information stored in in-vehicle network system 10 will be described first, with reference to FIG. 15. FIG. 15 is a diagram illustrating an example of a switching table according to Embodiment 3. In this embodiment, there is no one-to-one correspondence between the ID before change and the ID after change as in FIG. 9 and the like. The ID after change dynamically changes based on a predetermined condition.

As illustrated in FIG. 15, the switching table includes a switching rule number, a payload segment bit shift amount, and a slot ID increase.

The switching rule number is a number for identifying the payload segment bit shift amount and the slot ID increase. One payload segment bit shift amount and one slot ID increase are set for one switching rule number. In this embodiment, the switching rule number is a value corresponding to remainder Re (described later).

The payload segment bit shift amount indicates the bit shift amount when performing a bit shift operation process on a bit string forming the payload segment (see FIG. 3). For example, a different bit shift amount is set for each switching rule number. The bit shift amount may be a bit shift amount when performing a right shift in the bit shift operation process, or a bit shift amount when performing a left shift in the bit shift operation process. In detail, the bit shift operation process may be a right shift or a left shift. An example in which the bit shift operation process is a process of performing a right shift will be described below. For example, the switching rule "1" denotes right shifting the bit string of the payload segment by 1 bit. The bit shift operation process is, for example, carried out by a cyclic shift process.

The slot ID increase is information for determining the switched slot ID. For example, a different slot ID increase is set for each switching rule number. For example, the slot ID increase corresponding to the switching rule "0" is "0". In this case, the switched ID is set to the slot ID set beforehand. It is assumed hereafter that the slot ID of the slot set beforehand is 100. The slot ID increase corresponding to the switching rule "1" is "1". In this case, the switched ID is set to 101 as a result of increasing the slot ID of the slot set beforehand, i.e. 100, by 1.

In FIG. 15, the slot ID increases are "0" to "N", and the corresponding switched slot IDs are "100" to "100+N". Each switched slot ID is a slot ID of an empty slot to which a frame is not assigned yet. A switched slot ID may be, for example, selected from a dynamic frame. Using a dynamic frame as a switched slot ID has advantage that the payload length can be any value.

Although FIG. 15 illustrates an example in which the slot ID increases by 1 as the switching rule number increases, the present disclosure is not limited to such, as long as the slot ID differs for each switching rule number. The switched slot ID may increase by 2 or more (e.g. increase by 2). The increase may not be the same (e.g. increase by 1) for each switching rule number. The increase may be a negative value.

The switching table illustrated in FIG. 15 is, for example, stored in switching table holder 208.

[3-2. Operation of System]

Figure 16:
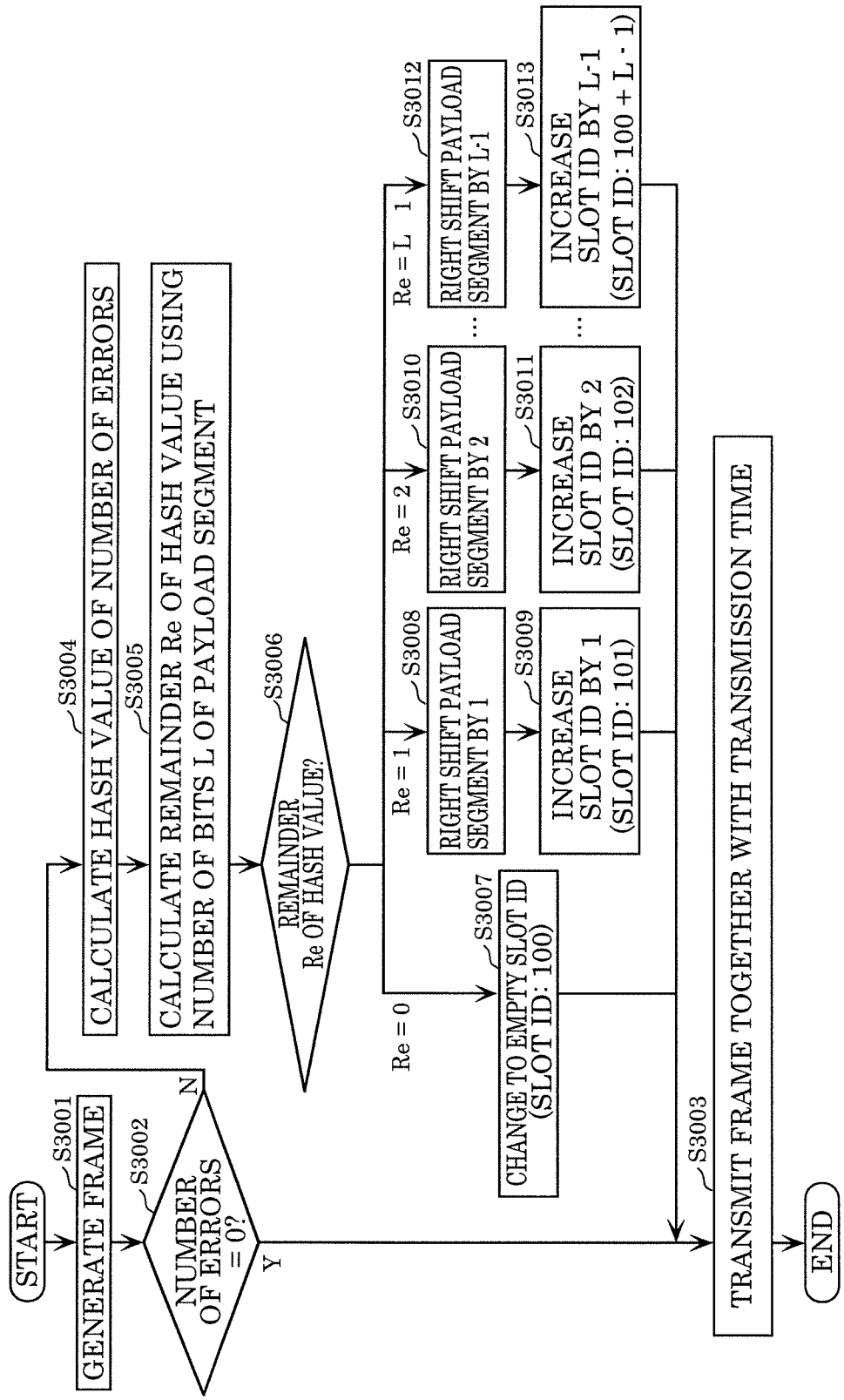
FIG. 16 is a diagram illustrating an example of operation of a transmitting-side ECU in Embodiment 3.

Operation in in-vehicle network system 10 according to this embodiment will be described below, with reference to FIGS. 16 and 17. FIG. 16 is a diagram illustrating an example of operation of a transmitting-side ECU in Embodiment 3.

As illustrated in FIG. 16, frame generator 205 generates a frame for notifying a state to another ECU, based on a signal notified from external device controller 204 (S3001).

Switching determinator 207 determines whether the number of errors is greater than or equal to a predetermined number, based on an anomaly determination result from anomaly determinator 206. In this embodiment, switching determinator 207 determines whether the number of errors is "0" (S3002). In detail, switching determinator 207 determines whether an error occurs. The number of errors is an example of the number of times an anomaly is detected.

In the case where switching determinator 207 determines that the number of errors is "0", i.e. no error occurs (S3002: Yes), switching determinator 207 notifies (outputs) information indicating that there is no error to frame generator 205. Frame generator 205 outputs a frame transmission request to transmit the generated frame, to frame transmitter/receiver 201. Frame transmitter/receiver 201 transmits the frame together with the transmission time, in response to the frame transmission request output from frame generator 205 (S3003). Frame transmitter/receiver 201 transmits, for example, the frame including the transmission time.

In the case where switching determinator 207 determines that the number of errors is not "0", i.e. an error occurs (S3002: No), switching determinator 207 references to the switching table (e.g. the switching table illustrated in FIG. 15) stored in switching table holder 208, and outputs a request to change the transmission contents to frame generator 205. For example, changing the transmission contents includes at least one of performing a bit shift operation process; and switching the slot ID.

Having obtained the information indicating changing the transmission contents from switching determinator 207, frame generator 205 calculates a hash value of the number of errors (S3004), and calculates remainder Re of the hash value using number of bits L of the payload segment (S3005). Frame generator 205 then performs a different process according to calculated remainder Re (S3006 to S3013). A hash function for calculating the hash value is, for example, stored in switching table holder 208. Number of bits L is not limited, but is, for example, 64 bits. In this case, the maximum value of remainder Re is 63.

By using remainder Re obtained by dividing the hash value by number of bits L, exhaustion of switched slot IDs can be prevented. Step S3004 is not limited to dividing the hash value by number of bits L. For example, the hash value may be divided by a predetermined numerical value. The predetermined numerical value may be determined as appropriate according to, for example, the number of empty slots. The method of calculating remainder Re is not limited to division, and may include addition, subtraction, multiplication, etc.

In the case where remainder Re is 0, frame generator 205 changes the slot ID to an empty slot ID set beforehand (slot ID "100" in the example in FIG. 16) (S3007). For example, frame generator 205 switches a frame that is supposed to be transmitted at slot ID "1", to slot ID "100", to transmit the frame at slot ID "100". Thus, for example, in the case where remainder Re is 0, frame generator 205 performs only the slot ID change process from among the bit shift operation process and the slot ID change process.

In the case where remainder Re is 1 or more, frame generator 205 performs each of the bit shift operation process and the slot ID change process. In detail, in the case where remainder Re is 1 or more, frame generator 205 performs a process for transmitting a frame obtained by performing the bit shift operation process on the payload segment included in the frame generated in Step S3001, at a slot ID different from the slot ID corresponding to the frame.

For example, in the case where remainder Re is 1, frame generator 205 right shifts the payload segment by 1 (S3008), and increases the switched slot ID by 1 (S3009). In this case, the resultant switched slot ID is slot ID "101" obtained by adding 1 to the slot ID set in Step S3007.

For example, in the case where remainder Re is 2, frame generator 205 right shifts the payload segment by 2 (S3010), and increases the switched slot ID by 2 (S3011). In this case, the resultant switched slot ID is slot ID "102" obtained by adding 2 to the slot ID set in Step S3007.

For example, in the case where remainder Re is $L-1$, frame generator 205 right shifts the payload segment by $L-1$ (S3012), and increases the switched slot ID by $L-1$ (S3013). In this case, the resultant switched slot ID is slot ID "100+L−1" obtained by adding $L-1$ to the slot ID set in Step S3007.

Thus, in this embodiment, the number of errors is an example of predetermined information for determining a switched slot ID.

Frame generator 205 then transmits the frame subjected to the bit shift operation process together with the transmission time, at the transmission timing of the switched slot ID (empty slot ID) (S3003).

Although FIG. 16 illustrates an example in which the payload segment shift amount and the slot ID increase are each the same value as the value of remainder Re, the present disclosure is not limited to such, as long as at least one of the payload segment shift amount and the slot ID increase is different for each remainder Re.

Although FIG. 16 illustrates an example in which the frame is transmitted at the switched slot ID in the case where the number of errors is not 0, the frame may be also transmitted at the slot ID before switching. That is, frame generator 205 may transmit the same frame by two or more slot IDs.

Although FIG. 16 illustrates an example in which the hash value is calculated from the number of errors, the present disclosure is not limited to such, and the payload segment shift amount and the slot ID increase may be directly determined according to the number of errors. For example, in the case where the number of errors is 1, the same process as in the case where remainder Re is 1 may be performed.

Although the above describes an example in which the frame including the transmission time is transmitted in Step S3003, the present disclosure is not limited to such. The transmission time may be transmitted in another frame. For example, the transmission time may be transmitted to another ECU at a slot ID which is a transmission timing before the slot ID assigned in the case where the determination in Step S3002 results in No. The number of errors may be transmitted at the slot ID, too. Thus, the ECUs on the transmitting and receiving sides can synchronize the transmission time and number of errors (i.e. share the transmission time and number of errors). Moreover, as a result of the information (at least one of the transmission time and the number of errors) for predicting the slot ID being transmitted, the receiving-side ECU can predict the switched slot ID beforehand.

Operation of an ECU receiving a frame in in-vehicle network system 10 according to this embodiment will be described below, with reference to FIG. 17. FIG. 17 is a diagram illustrating an example of operation of a receiving-side ECU in Embodiment 3.

Figure 17:
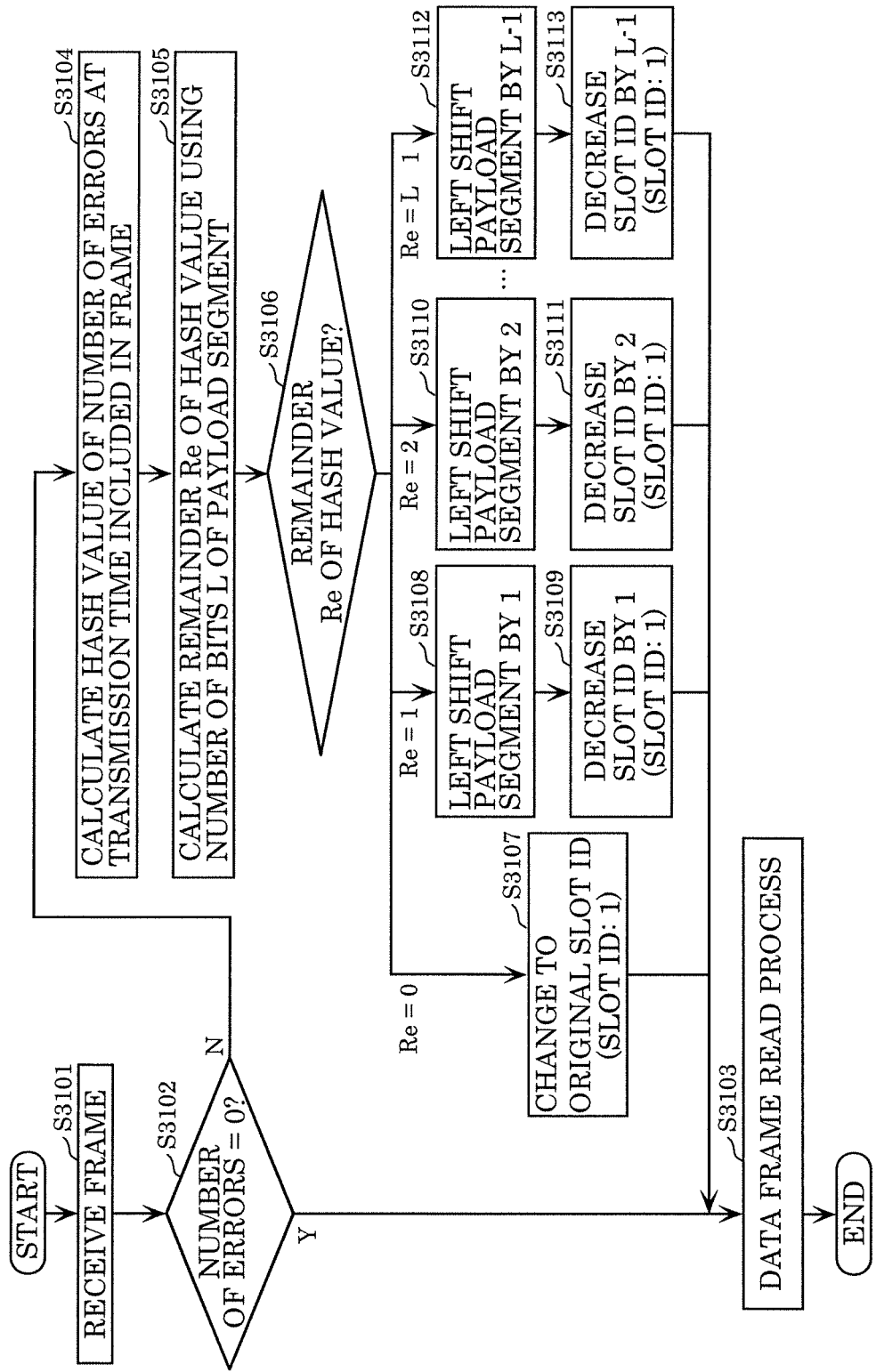
FIG. 17 is a diagram illustrating an example of operation of a receiving-side ECU in Embodiment 3.

As illustrated in FIG. 17, frame transmitter/receiver 201 receives the frame transmitted in Step S3003 (S3101). Frame transmitter/receiver 201 outputs the received frame to frame interpreter 203.

Frame interpreter 203 determines whether the number of errors corresponding to the slot ID of the received frame is greater than or equal to the predetermined number. For example, frame interpreter 203 determines whether the number of errors at the transmission time is greater than or equal to the predetermined number. In this embodiment, frame interpreter 203 determines whether the number of errors is "0" (S3102). In detail, frame interpreter 203 determines whether an error occurs at the slot ID.

In the case where frame interpreter 203 determines that the number of errors is "0", i.e. no error occurs (S3102: Yes), frame interpreter 203 performs a data frame read process (S3103). Frame interpreter 203 interprets the payload included in the frame, and notifies external device controller 204 to control the device (e.g. front camera 210 in the case of ECU 200a) connected to the ECU according to the contents of the payload.

In the case where frame interpreter 203 determines that the number of errors is not "0", i.e. an error occurs (S3102: No), frame interpreter 203 performs a process (correction process) which is the reverse of the process in Steps S3007 to S3013. That is, frame interpreter 203 performs a bit shift return process (bit position correction process) and a slot ID return process.

Specifically, frame interpreter 203 calculates a hash value of the number of errors at the transmission time included in the frame (S3104). The number of errors used here is the same as the number of errors used in Step S3004. Hence, the hash value calculated in Step S3104 is the same as the hash value calculated in Step S3004.

Next, frame interpreter 203 calculates remainder Re of the hash value using number of bits L of the payload segment (S3105). Remainder Re calculated here is the same as remainder Re calculated in Step S3005. Frame interpreter 203 then performs a different process according to calculated remainder Re (S3106 to S3113).

In the case where remainder Re is 0, frame interpreter 203 changes the frame transmitted at slot ID "100" to the original slot ID (S3107), as the process corresponding to Step S3007. Thus, for example, in the case where remainder Re is 0, frame interpreter 203 performs only the slot ID return process from among the bit shift return process and the slot ID return process.

For example, frame interpreter 203 changes slot ID "100" to slot ID "1" which is the original slot ID. In detail, frame interpreter 203 can recognize that the frame received at slot ID "100" is originally a frame that was supposed to be transmitted at slot ID "1". For example, frame interpreter 203 can recognize that the frame received at slot ID "100" is a frame including speed, based on the frame list illustrated in FIG. 7.

In the case where remainder Re is 1 or more, frame interpreter 203 performs each of the bit shift return process and the slot ID return process.

For example, in the case where remainder Re is 1, frame interpreter 203 left shifts the payload segment by 1 (S3108) as the process corresponding to Step S3008, and decreases the slot ID by 1 (S3109) as the process corresponding to Step S3009. For example, in the case where remainder Re is 2, frame interpreter 203 left shifts the payload segment by 2 (S3110) as the process corresponding to Step S3010, and decreases the slot ID by 2 (S3111) as the process corresponding to Step S3011. For example, in the case where remainder Re is L−1, frame interpreter 203 left shifts the payload segment by L−1 (S3112) as the process corresponding to Step S3012, and decreases the slot ID by L−1 (S3113) as the process corresponding to Step S3013.

Consequently, the frame returns to the contents generated in Step S3001, and the slot ID returns to the slot ID corresponding to the returned frame (e.g. slot ID "1"). Hence, even in the case where the frame is subjected to the bit shift operation process and the slot ID change process, frame interpreter 203 can appropriately obtain information (e.g. speed) in the frame.

Next, frame interpreter 203 performs the data frame read process (S3103).

Thus, in this embodiment, the frame of the slot ID in which an error is detected can be changed to the switched slot ID that is dynamically set according to the number of errors. This prevents an attacker from predicting the changed slot and attacking the changed slot. For example, an attack against the changed slot can be suppressed as compared with the case where the switched slot ID is determined based on a simple table.

(Variation of Embodiment 3)

Figure 18:
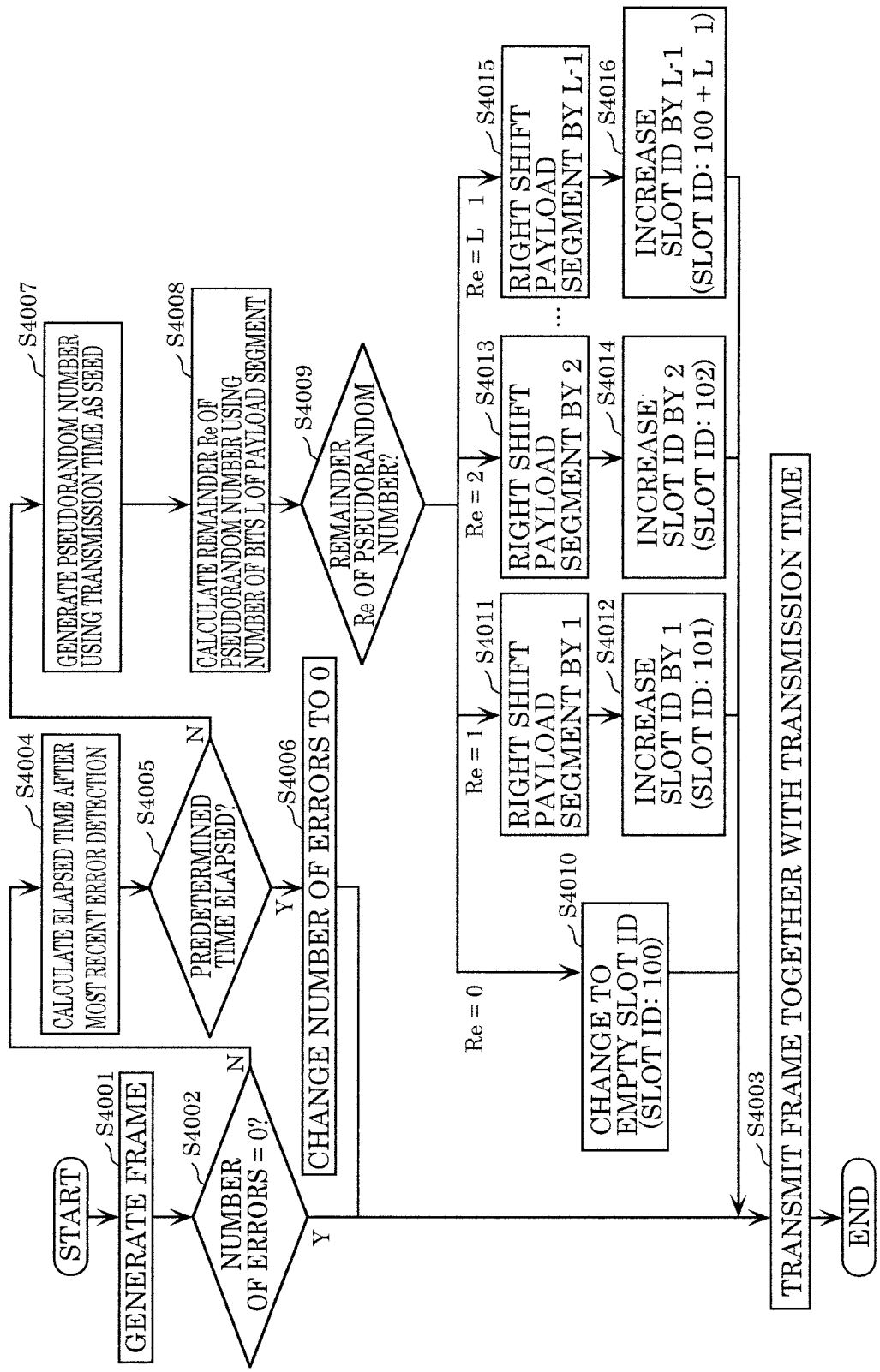
FIG. 18 is a diagram illustrating an example of operation of a transmitting-side ECU in a variation of Embodiment 3.

Operation in in-vehicle network system 10 according to this variation will be described below, with reference to FIGS. 18 and 19. This variation describes the case where the switched slot ID to which the slot ID in which an anomaly is detected is switched changes dynamically based on the time information (e.g. transmission time) about the frame in which an anomaly is detected. FIG. 18 is a diagram illustrating an example of operation of a transmitting-side ECU in the variation of Embodiment 3. The description of the same operation as that of the transmitting-side ECU in Embodiment 3 is omitted or simplified. Steps S4001 to S4003 are respectively the same processes as Steps S3001 to S3003 in FIG. 16. Steps S4010 to S4016 are respectively the same processes as Steps S3007 to S3013 in FIG. 16.

As illustrated in FIG. 18, in the case where the number of errors is not 0 (S4002: No), frame generator 205 calculates the elapsed time after the most recent error detection (S4004). The elapsed time is, for example, the time from when an error is detected last time at the slot ID corresponding to the frame to when an error is detected this time at the slot ID corresponding to the frame. For example, anomaly determinator 206 may store the time at which an error is detected in switching table holder 208, and calculate the elapsed time based on the stored time.

Next, frame generator 205 determines whether a predetermined time has elapsed (S4005). For example, frame generator 205 performs the determination based on whether the elapsed time is greater than or equal to the predetermined time. The predetermined time is not limited, but is, for example, 1 hour.

In the case where frame generator 205 determines that the predetermined time has elapsed (S4005: Yes), frame generator 205 changes the number of errors to 0 (S4006). That is, frame generator 205 resets the number of errors. Frame generator 205 then performs the process in Step S4003. That is, even in the case where the number of errors is 1 or more, when the predetermined time has elapsed, frame generator 205 transmits the frame generated in Step S4001 at the slot ID corresponding to the frame.

In the case where frame generator 205 determines that the predetermined time has not elapsed (S4005: No), frame generator 205 performs a process for performing at least one of the bit shift operation process and the slot ID change process. Thus, in the case where errors occur continuously (the anomalous state continues), frame generator 205 can perform a process for maintaining the secure state of in-vehicle network system 10.

In this embodiment, frame generator 205 generates a pseudorandom number using the transmission time of the frame as a seed (S4007). The transmission time may be the scheduled transmission time of the frame, or the current time when performing the process for transmitting the frame. Frame generator 205 then calculates remainder Re of the pseudorandom number using number of bits L of the payload segment (S4008), and performs a different process according to calculated remainder Re (S4009 to S4016).

Frame generator 205 then transmits the frame (e.g. the frame subjected to the bit shift operation process) together with the transmission time, at the transmission timing of the switched slot ID (empty slot ID) (S4003). The transmission time here is, for example, the same as the transmission time used as a seed for generating the pseudorandom number in Step S3007.

Although the transmission time is used as a seed in Step S4007, the present disclosure is not limited to such. Frame generator 205 may use information that is synchronous between the ECUs on the transmitting and receiving sides, as a seed in Step S4007. For example, frame generator 205 may generate the pseudorandom number using the number of cycles included in the frame generated in Step S4001 as a seed, or generate the pseudorandom number using the previous pseudorandom number. The pseudorandom number generation method is not limited to the above, but the same process is performed in the receiving-side ECU. The same process means that, in the case where the transmitting-side ECU generates the pseudorandom number using the previous pseudorandom number as a seed, the receiving-side ECU equally generates the pseudorandom number using the previous pseudorandom number as a seed (see S4107 in FIG. 19 described later). The two previous pseudorandom numbers are the same value.

Operation of an ECU receiving a frame in in-vehicle network system 10 according to this variation will be described below, with reference to FIG. 19. FIG. 19 is a diagram illustrating an example of operation of a receiving-side ECU in the variation of Embodiment 3. The description of the same operation as that of the receiving-side ECU in Embodiment 3 is omitted or simplified. Steps S4101 to S4103 are respectively the same processes as Steps S3101 to S3103 in FIG. 17. Steps S4110 to S4116 are respectively the same processes as Steps S3107 to S3113 in FIG. 17.

Figure 19:
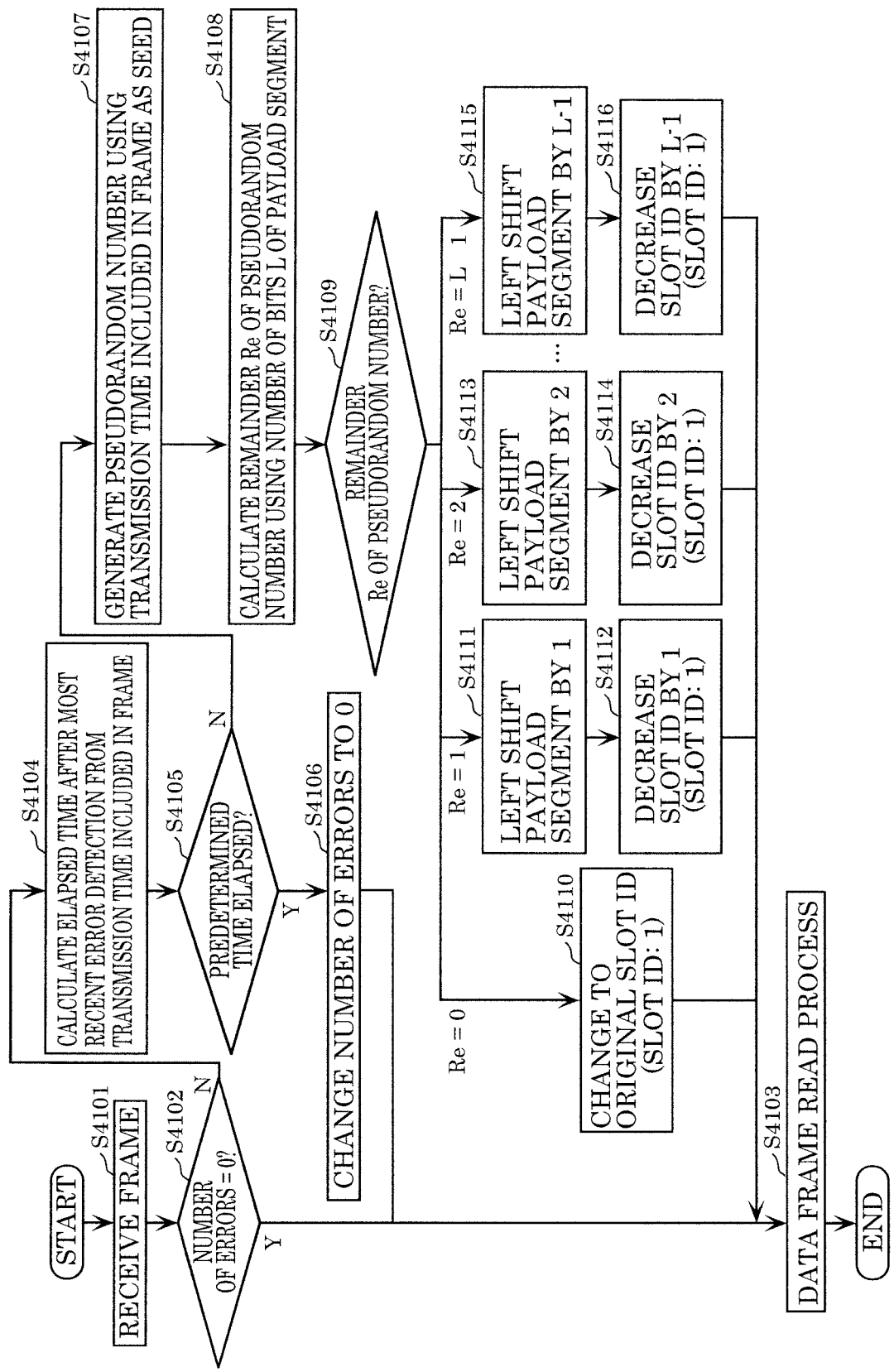
FIG. 19 is a diagram illustrating an example of operation of a receiving-side ECU in the variation of Embodiment 3.

As illustrated in FIG. 19, in the case where the number of errors is not 0 (S4102: No), frame interpreter 203 calculates the elapsed time after the most recent error detection from the transmission time included in the frame (S4104). For example, frame interpreter 203 may store the transmission time included in the frame in a storage (not illustrated), and calculate the elapsed time based on the transmission time included in the received frame and the transmission time stored in the storage. The elapsed time calculated in Step S4104 is the same as the elapsed time calculated in Step S4004.

Next, frame interpreter 203 determines whether a predetermined time has elapsed (S4105). For example, frame interpreter 203 performs the determination based on whether the elapsed time is greater than or equal to the predetermined time. The predetermined time in Step S4105 is the same as the predetermined time in Step S4005, and is, for example, 1 hour.

In the case where frame interpreter 203 determines that the predetermined time has elapsed (S4105: Yes), frame interpreter 203 changes the number of errors to 0 (S4106). That is, frame interpreter 203 resets the number of errors. Frame interpreter 203 then performs the process in Step S4103. That is, even in the case where the number of errors is 1 or more, when the predetermined time has elapsed, frame interpreter 203 performs the data frame read process without processing the frame received in Step S4101 (S4103).

In the case where frame interpreter 203 determines that the predetermined time has not elapsed (S4105: No), frame interpreter 203 generates a pseudorandom number using the transmission time included in the frame as a seed (S4107). The pseudorandom number generated in Step S4107 is the same as the pseudorandom number generated in Step S4007. Frame interpreter 203 calculates remainder Re of the pseudorandom number using number of bits L of the payload segment (S4108). Remainder Re calculated in Step S4108 is the same as remainder Re calculated in Step S4008. Frame interpreter 203 then performs a different process according to calculated remainder Re (S4109 to S4116).

Thus, in this variation, the transmission time is an example of predetermined information for determining a switched slot ID.

Next, frame interpreter 203 performs the data frame read process (S4103).

Thus, in this embodiment, the frame of the slot ID in which an error is detected can be changed to the switched slot ID that is dynamically set according to the time information of the frame in which an anomaly is detected, such as elapsed time. This prevents an attacker from predicting the changed slot and attacking the changed slot. For example, an attack against the changed slot can be suppressed as compared with the case where the switched slot ID is determined based on a simple table.

Embodiment 4

[4-1. Structure of System]

This embodiment describes the case where, when switching the slot ID of a frame in which an anomaly is detected, the switched slot ID to which the slot ID is switched changes dynamically. Specifically, this embodiment describes the case where the switched slot ID to which the slot ID in which an anomaly is detected is switched changes dynamically based on the risk of the frame in which an error occurs.

The risk indicates the degree of influence on the security of vehicle driving in the case where anomalous information (e.g. anomalous payload information) is transmitted in the slot. When the risk is higher, payload information needs to be notified more accurately.

The risk of the frame is, for example, set according to the signal type included in the frame. For example, the signal type includes at least one of: "driving control signal" relating to a control instruction in vehicle driving (e.g. run, turn, stop, etc.); "body control signal" relating to a control instruction on the body system; and "vehicle state signal" notifying a state (e.g. the state of the vehicle or its surroundings) obtained from a sensor or the like.

In the case of setting the risk for each of these signal types, for example, if the signal included in the frame includes a driving control signal, the risk is set to "high". If the signal included in the frame includes a body control signal, the risk is set to "medium". If the signal included in the frame includes a vehicle state signal, the risk is set to "low".

The risk may be set according to the number of signal types included in the frame. For example, a score is assigned to each signal type, and the risk is set according to the total score of signal types included in the frame.

The risk setting is not limited to three levels of "low", "medium", and "high", and may be two levels or four or more levels. The risk may be represented by a numerical value. For example, the risk may be set as a numerical value from 0 (risk: minimum) to 100 (risk: maximum).

An in-vehicle network system according to this embodiment has the same structure as in-vehicle network system 10 according to Embodiment 1 or in-vehicle network system 20 according to Embodiment, and accordingly its description is omitted here. An example in which the in-vehicle network system according to this embodiment has the same structure as in-vehicle network system 10 according to Embodiment 1 will be described below.

Information stored in in-vehicle network system 10 will be described first, with reference to FIG. 20. FIG. 20 is a diagram illustrating an example of a frame list transmitted in FlexRay communication in Embodiment 4.

As illustrated in FIG. 20, each slot ID to which a frame is assigned is associated with a risk. Specifically, each slot ID is associated with the risk corresponding to the type of the payload information. For example, in slot ID "1", the payload information is "speed", and the corresponding risk is "low".

Slot ID "2" is a slot to which no frame is assigned. That is, slot ID "2" is an empty slot.

A switching table indicated in the frame list illustrated in FIG. 20 is, for example, stored in switching table holder 208.

[4-2. Operation of System]

Figure 21A:
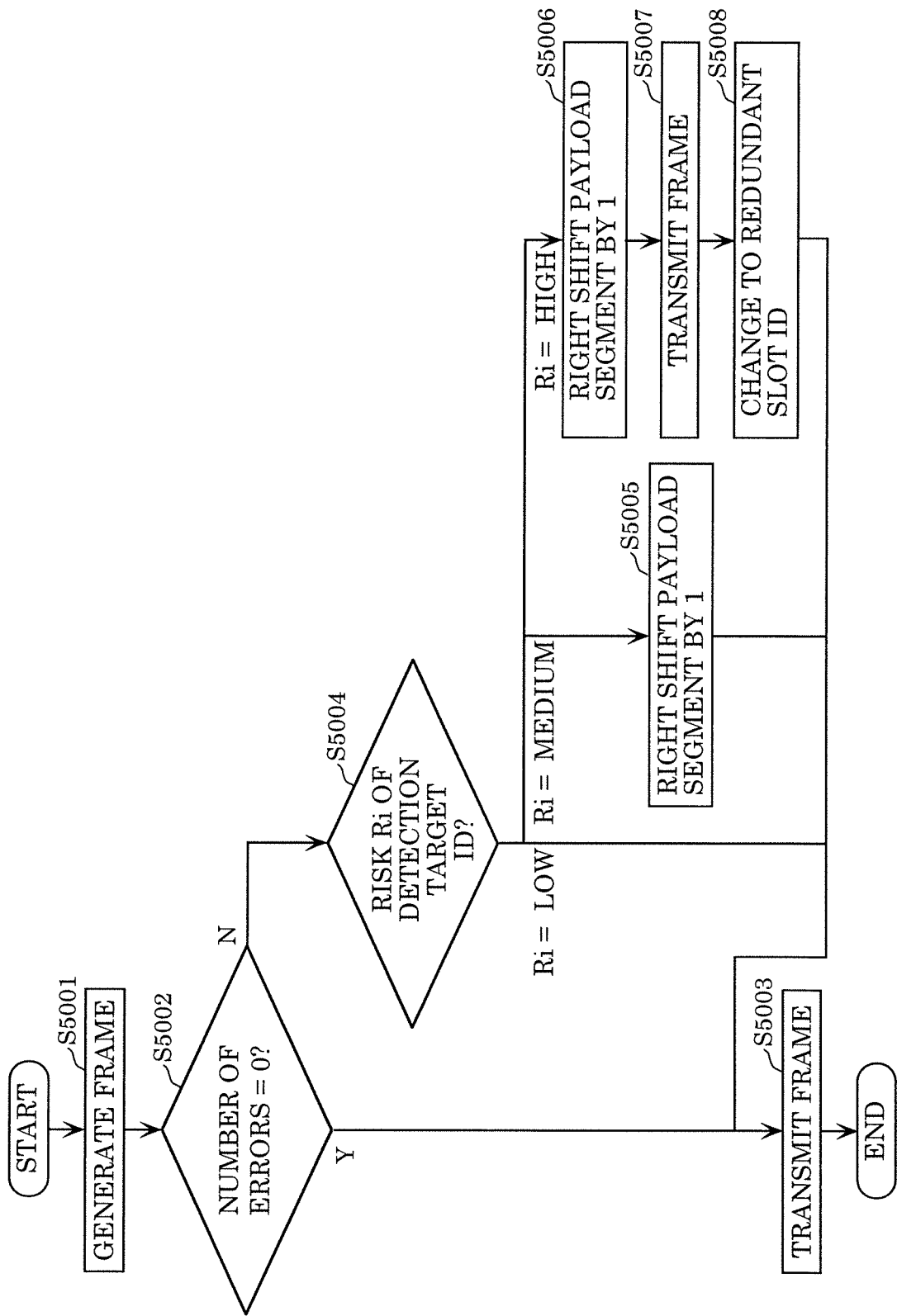
FIG. 21A is a diagram illustrating an example of operation of a transmitting-side ECU in Embodiment 4.

Operation in in-vehicle network system 10 according to this embodiment will be described below, with reference to FIGS. 21A to 22. FIG. 21A is a diagram illustrating an example of operation of a transmitting-side ECU in Embodiment 4. Steps S5001 and S5002 in FIG. 21A are respectively the same processes as Steps S3001 and S3002 in FIG. 16.

As illustrated in FIG. 21A, in the case where switching determinator 207 determines that the number of errors is "0", i.e. no error occurs (S3002: Yes), switching determinator 207 notifies (outputs) information indicating that there is no error to frame generator 205. Frame generator 205 outputs a frame transmission request to transmit the generated frame, to frame transmitter/receiver 201. Frame transmitter/receiver 201 transmits the frame at the transmission timing corresponding to the slot ID of the frame, in response to the frame transmission request notified from frame generator 205 (S5003).

In the case where switching determinator 207 determines that the number of errors is not "0", i.e. an error occurs (S5002: No), switching determinator 207 references to the frame list (e.g. the frame list illustrated in FIG. 20) notified from switching table holder 208, determines risk Ri of the detection target ID (the slot ID in which an error is detected) (S5004), and outputs a request to change the transmission contents to frame generator 205.

Having obtained the information indicating changing the transmission contents from switching determinator 207, frame generator 205 performs a different process according to risk Ri (S5005 to S5008).

In the case where risk Ri is "low", frame generator 205 performs the process in Step S5003. That is, even in the case where the number of errors is 1 or more, when the risk is less than or equal to a predetermined level (e.g. the risk is "low"), frame generator 205 transmits the frame generated in Step S5001 at the slot ID corresponding to the frame.

In the case where risk Ri is "medium" which is higher than "low", frame generator 205 right shifts the payload segment by 1 (S5005), and transmits the frame whose payload segment has been right shifted by 1 at the slot ID corresponding to the frame (S5003). Frame generator 205 performs only the bit shift operation process from among the bit shift operation process and the slot ID change process.

In the case where risk Ri is "high" which is higher than "medium", frame generator 205 right shifts the payload segment by 1 (S5006), and transmits the frame whose payload segment has been right shifted by 1 at the slot ID corresponding to the frame (S5007). Frame generator 205 then changes the slot ID of the frame to a redundant slot ID (S5008). For example, an empty slot is assigned to the redundant slot. The redundant slot may be set beforehand, or dynamically set according to the risk.

Frame generator 205 transmits the frame whose payload segment has been right shifted by 1, at the redundant slot ID (S5003). That is, in the case where risk Ri is "high", frame generator 205 transmits the same frame by different slot IDs. Frame generator 205 can therefore transmit the same frame a plurality of times (twice in the example in FIG. 21A). Thus, in the case where risk Ri is greater than or equal to the predetermined level (e.g. in the case where risk Ri is "high"), for example, in the case where a dangerous attack is detected, frame generator 205 may perform a process of increasing the number of transmission slots for the frame. In other words, in the case where risk Ri is greater than or equal to the predetermined level, frame generator 205 may transmit a redundant frame. The redundant frame is the frame transmitted at the redundant slot ID, and is the frame transmitted in Step S5003 after Step S5008 in FIG. 21A. In the case where the risk is less than the predetermined level, the process of increasing the number of transmission slots is not performed, so that the throughput in the transmitting-side ECU can be reduced.

Step S5006 may be omitted. That is, in the case where the risk is "high", frame generator 205 may perform a process of transmitting the frame generated in Step S5001 twice. Moreover, the bit shift amounts in Steps S5005 and S5006 may be different.

Figure 21B:
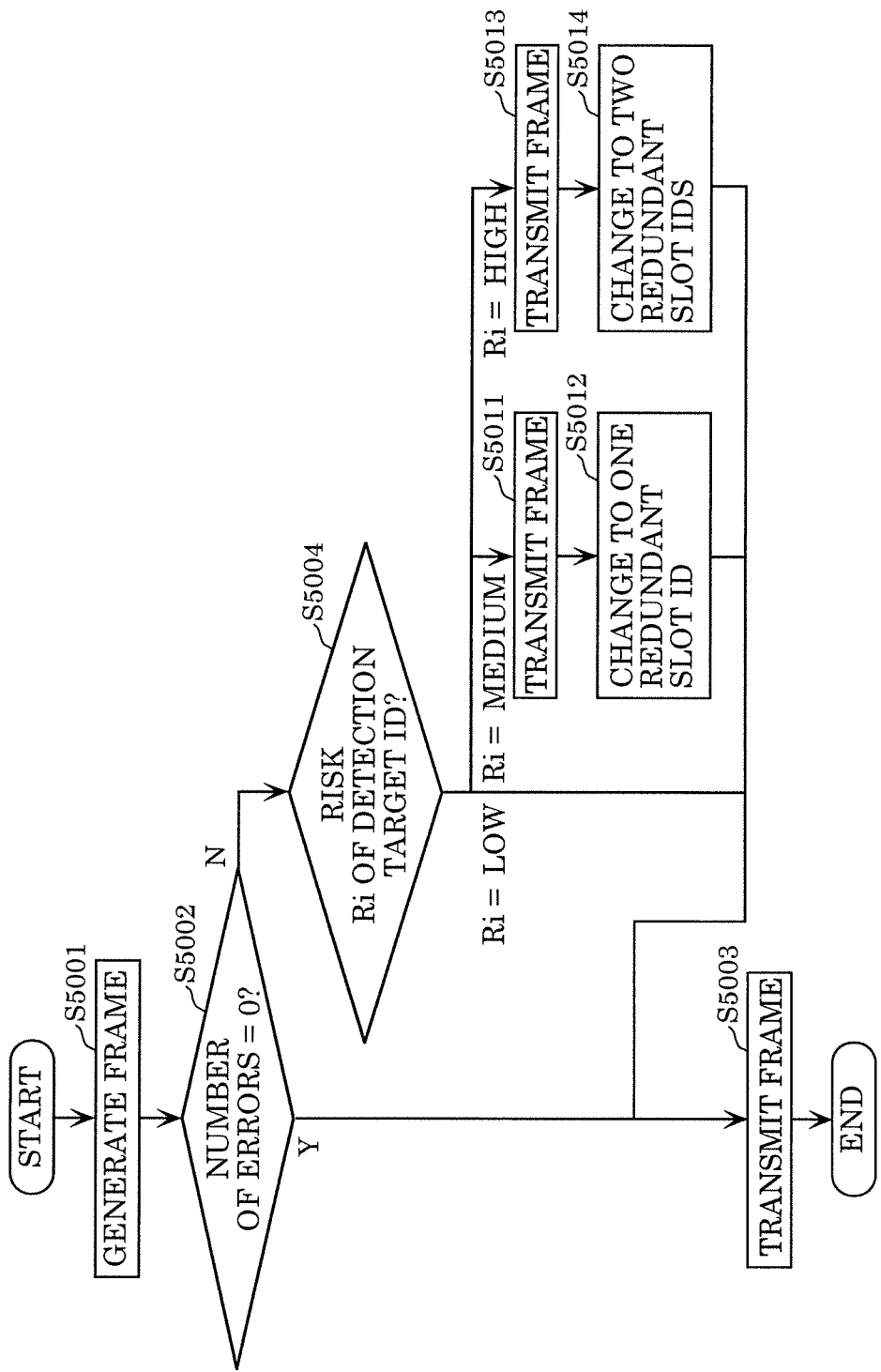
FIG. 21B is a diagram illustrating another example of operation of a transmitting-side ECU in Embodiment 4.

Frame generator 205 may perform the process illustrated in FIG. 21B, instead of the process illustrated in FIG. 21A.

FIG. 21B is a diagram illustrating another example of operation of a transmitting-side ECU in Embodiment 4. In FIG. 21B, the same processes as those in FIG. 21A are given the same reference marks, and their description is omitted or simplified.

As illustrated in FIG. 21B, frame generator 205 may change the number of redundant slot IDs according to risk Ri. For example, frame generator 205 may use more redundant slot IDs for the frame when risk Ri is higher.

For example, in the case where risk Ri is "medium", frame generator 205 transmits the frame generated in Step S5001 at the slot ID corresponding to the frame (S5011), and also changes the slot ID corresponding to the frame to one redundant slot ID (S5012). Frame generator 205 then transmits the frame at one redundant slot ID (5003). Thus, frame generator 205 can transmit the same frame twice by different slot IDs.

For example, in the case where risk Ri is "high", frame generator 205 transmits the frame generated in Step S5001 at the slot ID corresponding to the frame (S5013), and also changes the slot ID corresponding to the frame to two redundant slot IDs (S5014). Frame generator 205 then transmits the frame at each of the two redundant slot IDs (S5003). Thus, frame generator 205 can transmit the same frame three times by different slot IDs.

The number of redundant slot IDs to which the slot ID is changed in each of Steps S5012 and S5014 is not limited to the above, as long as the number of redundant slot IDs when risk Ri is "high" is greater than the number of redundant slot IDs when risk Ri is "medium". The redundant slot ID(s) to which the slot ID is changed in Step S5012 and the redundant slot IDs to which the slot ID is changed in Step S5014 may be different from each other, or include at least one same slot ID.

Thus, in this embodiment, the risk of the frame is an example of predetermined information for determining a switched slot ID.

Information about the redundant slot ID in Step S5008 in FIG. 21A or information about the redundant slot IDs in Steps S5012 and S5014 in FIG. 21B may be included in the frame transmitted in Step S5003, or may be transmitted in another empty slot. Thus, the ECUs on the transmitting and receiving sides share the information about the redundant slot ID(s). The information about the redundant slot ID(s) includes, for example, information for specifying the redundant slot ID corresponding to slot ID "1".

Although the above describes an example in which frame generator 205 obtains the risk of the frame based on the frame list notified from switching table holder 208 in Step S5004, the present disclosure is not limited to such. Frame generator 205 may obtain the risk of the frame, by determining the risk of the frame according to the signal type included in the frame generated in Step S5001. For example, in the case where the frame generated in Step S5001 includes a driving control signal, frame generator 205 may determine the risk of the frame as "high" in Step S5004.

Operation of an ECU receiving a frame in in-vehicle network system 10 according to this embodiment will be described below, with reference to FIG. 22. FIG. 22 is a diagram illustrating an example of operation of a receiving-side ECU in Embodiment 4. Steps S5101 to S5103 in FIG. 22 are respectively the same processes as Steps S3101 to S3103 in FIG. 17. FIG. 22 illustrates the process of the receiving-side ECU in the case where the transmitting-side ECU performs the process illustrated in FIG. 21A.

Figure 22:
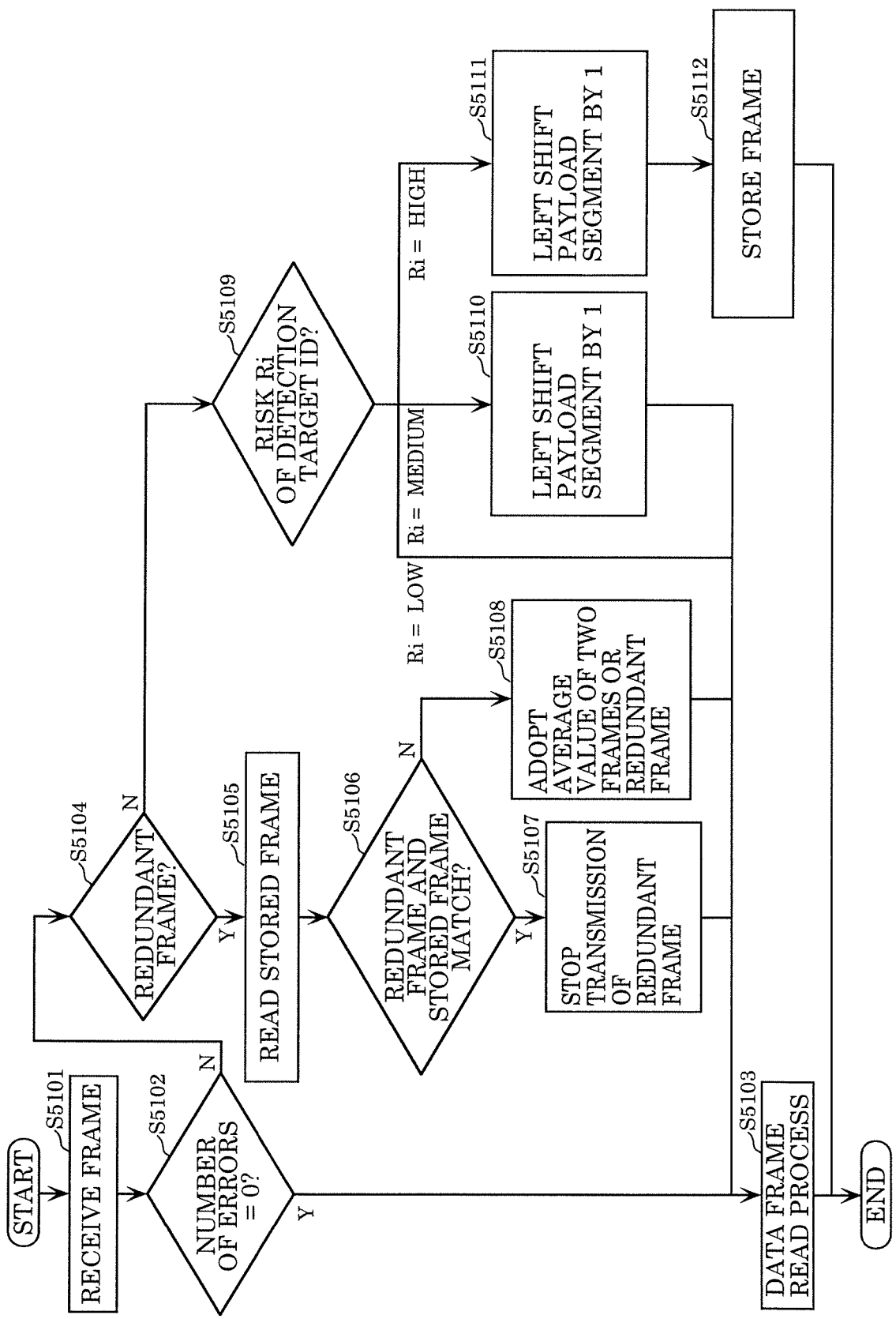
FIG. 22 is a diagram illustrating an example of operation of a receiving-side ECU in Embodiment 4.

As illustrated in FIG. 22, in the case where the number of errors is not 0 (S5102: No), frame interpreter 203 determines whether the frame received in Step S5101 is a redundant frame (S5104). For example, frame interpreter 203 may determine whether the frame received in Step S5101 is a redundant frame, based on information about the redundant slot ID obtained from the frame or a frame received at a transmission timing (e.g. a transmission timing before the frame) different from that of the frame. For example, in the case where the frame transmitted in Step S5007 is received, frame interpreter 203 may perform a process for identifying the redundant slot ID of the frame based on at least one of the number of errors and risk Ri in the frame. Frame interpreter 203 may perform, for example, the processes in Steps S5002, S5004, and S5008. This enables the receiving-side ECU to know which empty slot ID is used as the redundant slot ID by the transmitting-side ECU. Based on the result, frame interpreter 203 may determine whether the frame received in Step S5101 is a redundant frame.

In the case where frame interpreter 203 determines that the frame is a redundant frame (S5104: Yes), frame interpreter 203 reads a stored frame (S5105). In this case, the stored frame is the frame transmitted in Step S5007. The stored frame is stored in a storage (not illustrated).

Frame interpreter 203 then determines whether the redundant frame and the stored frame match (S5106). The redundant frame and the stored frame are supposed to be the frames of the same contents. For example, the redundant frame and the stored frame are supposed to be equal in data "0" to data "n" included in the payload segment. Hence, frame interpreter 203 can determine whether any of the frames is an anomalous frame, based on whether the redundant frame and the stored frame match.

In the case where the redundant frame and the stored frame match (S5106: Yes), frame interpreter 203 performs a process of stopping the transmission of the redundant frame (S5107). For example, frame interpreter 203 outputs, to frame generator 205, information indicating transmitting information for stopping the transmission of the redundant frame corresponding to the stored frame. Frame generator 205 transmits, for example, the information for stopping the transmission of the redundant frame corresponding to the stored frame, at an empty slot ID.

In the case where the redundant frame and the stored frame do not match (S5106: No), frame interpreter 203 adopts the average value of the two frames or the redundant frame (S5108). For example, for information indicated by a numerical value such as speed, frame interpreter 203 may use the average value of the two frames as the numerical value (e.g. speed) in the frame. Thus, even in the case where one of the frames is an anomalous frame, an increase of its influence can be suppressed. For information for which an average value has no significance, such as a flag value ("0" or "1"), frame interpreter 203 preferentially adopts information in the redundant frame.

Thus, the receiving-side ECU can adopt the information in the redundant frame which is less recognizable to the attacker, so that more reliable information can be obtained.

Although the above describes an example in which frame interpreter 203 adopts the average value of the two frames in the case where the determination in Step S5106 results in No, frame interpreter 203 may adopt the median value, the mode value, or the like.

In the case where the determination in Step S5106 results in No, frame interpreter 203 may adopt the information of the redundant frame regardless of the type of the information (e.g. payload information) included in the frame.

In the case where frame interpreter 203 determines that the frame is not a redundant frame (S5104: No), e.g. the frame is the frame transmitted in Step S5007 in FIG. 21A, frame interpreter 203 determines risk Ri of the detection target ID (the slot ID of the frame) based on the frame list illustrated in FIG. 20 (S5109). For example, frame interpreter 203 references to the frame list (e.g. the frame list illustrated in FIG. 20), and determines risk Ri of the detection target ID (the slot ID in which an error is detected). Frame interpreter 203 then performs a different process according to risk Ri (S5110 to S5112).

In the case were risk Ri is "low", frame interpreter 203 performs the process in Step S5103.

In the case where risk Ri is "medium", frame generator 205 left shifts the payload segment by 1 (S5110), as the process corresponding to Step S5005. Frame interpreter 203 then performs the process in Step S5103.

In the case where risk Ri is "high", frame generator 205 left shifts the payload segment by 1 (S5111), as the process corresponding to Step S5006. Frame interpreter 203 stores the frame whose payload segment has been left shifted by 1 in a storage (not illustrated) (S5112). The frame stored in Step S5112 is used as the stored frame in Step S5106. Frame interpreter 203 then ends the process for the frame, without performing the data frame read process for the frame.

Thus, in this embodiment, the frame of the slot ID in which an error is detected can be changed to the switched slot ID that is dynamically set according to the risk of the frame. This prevents an attacker from predicting the changed slot and attacking the changed slot. For example, an attack against the changed slot can be suppressed as compared with the case where the switched slot ID is determined based on a simple table.

Although the above describes an example in which a different process is performed according to risk Ri of the detection target ID, the present disclosure is not limited to such, and risk Ri may be determined based on the current vehicle state. The vehicle state may be any of parked, stopped, driving, and the like, or any of "slow", "medium", "fast", and the like in speed. For example, in the case where the vehicle state includes speed, higher risk Ri is set when the speed is faster. In this case, the vehicle information is an example of predetermined information for determining a switched slot ID.

Although the above describes an example in which frame interpreter 203 obtains the risk of the received frame based on the frame list in Step S5109, the present disclosure is not limited to such. Frame interpreter 203 may obtain the risk of the frame, by determining the risk of the frame according to the signal type included in the frame received in Step S5101. For example, in the case where the frame received in Step S5101 includes a driving control signal, frame interpreter 203 may determine the risk of the frame as "high" in Step S5109.

(Variation of Embodiment 4)

Figure 23:
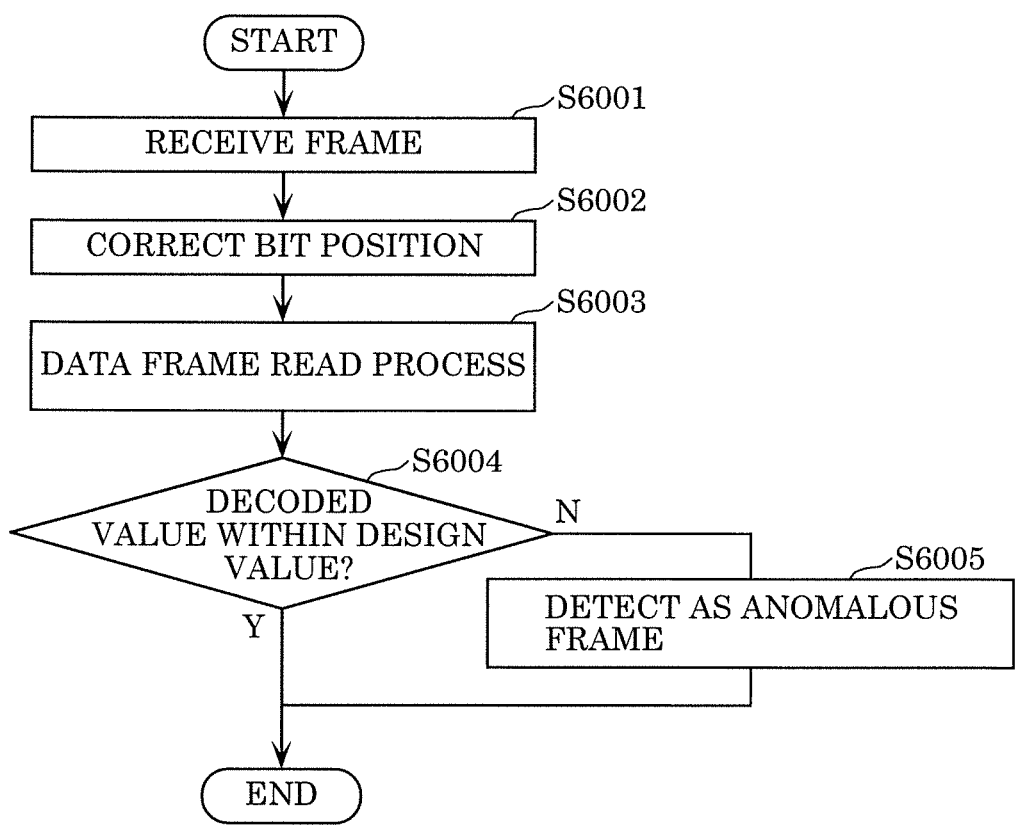
FIG. 23 is a diagram illustrating an example of operation of a receiving-side ECU in a variation of Embodiment 4.

Operation in in-vehicle network system 10 according to this variation will be described below, with reference to FIG. 23. This variation describes an example in which the receiving-side ECU detects whether the received frame is an anomalous frame. FIG. 23 is a diagram illustrating an example of operation of a receiving-side ECU in the variation of Embodiment 4.

As illustrated in FIG. 23, frame transmitter/receiver 201 receives the frame transmitted in Step S5003 (S6001). Step S6001 corresponds to Step S5101 in FIG. 22.

Next, frame interpreter 203 corrects the bit position of the received frame (S6002). Step S6002 corresponds to Step S5110 in FIG. 22.

Next, frame interpreter 203 performs a data frame read process on the frame whose bit position has been corrected (S6003). Step S6003 corresponds to Step S5103 in FIG. 22. Frame interpreter 203 outputs the read result to anomaly determinator 206.

Next, anomaly determinator 206 determines whether a decoded value based on the data frame is within a design value (S6004). The decoded value is information of a numerical value extracted from the data frame. For example, in the case where the payload information of the frame is speed, the decoded value is the speed extracted from the data frame. The design value is a value corresponding to the type of the payload information. In the case where the payload information is speed, the design value is set to a value unrealistic as speed, and may be, for example, 3000 km/h.

In the case where the frame has a field including a magic number, anomaly determinator 206 may perform the determination in Step S6004 based on whether the value obtained by decoding the magic number matches the design value. In this case, the design value is not a numerical range, but is set to one numerical value. A perfect match between the decoded value and the design value is an example that the decoded value is within the design value.

In the case where the frame has the field including a magic number, anomaly determinator 206 may perform the determination in Step S6004 based on whether the sequence of "0" and "1" (bit sequence) of the magic number matches the design value. In this case, the design value is a sequence of "0" and "1".

In the case where the decoded value is within the design value (S6004: Yes), anomaly determinator 206 ends the process of determining whether the frame received in Step S6001 is an anomalous frame. In the case where the decoded value is not within the design value (S6004: No), anomaly determinator 206 detects the frame as an anomalous frame (S6005). Anomaly determinator 206 may output information indicating that the frame is determined as an anomalous frame, to frame generator 205. Frame generator 205 may transmit anomalous frame information including information (e.g. slot ID) for identifying the frame determined as an anomalous frame by anomaly determinator 206 and information indicating that the frame is an anomalous frame, to another ECU. Frame generator 205 may transmit, for example, the anomalous frame information by an empty slot.

Thus, for example, in the case where the attacker transmits an anomalous frame without knowing that the bit shift operation process is performed, whether the frame is an anomalous frame can be easily determined based on a sequence of "0" and "1".

(Other variations)

While the presently disclosed techniques have been described by way of the foregoing embodiments, the present disclosure is not limited to the foregoing embodiments. The following variations are also included in the scope of the present disclosure.

(1) Although the foregoing Embodiment 1 describes an example in which the switching table is held statically, the switching table may be generated after the communication start by dynamically searching for empty slots. In such a case, a synchronous frame for sharing the table may be newly transmitted at the communication start.

(2) Although the foregoing Embodiment 1 describes an example in which the transmission frame is switched from the slot before switching to the slot after switching, the transmission in both slots may be continued. In such a case, the contents of the frames transmitted in both slots may be compared. Then, only in the case where the contents are the same, the contents may be adopted. In the case where the contents of the frames transmitted in both slots are different, only the contents of the frame transmitted in the slot after switching may be adopted.

(3) Although the foregoing embodiments describe an example in which an error of a frame is detected to perform switching, the anomaly detection method is not limited to such. an anomalous frame may be detected in the case where the payload does not conform to a predetermined payload. Alternatively, a frame that differs sharply from its previous frame may be determined as anomalous. Such an anomaly detection result may be notified to the communication partner in another slot determined beforehand with the communication partner.

(4) Although the foregoing embodiments describe an example in which the ID is switched from a static slot to a dynamic slot, switching may be performed from a dynamic slot to a static slot, between dynamic slots, or between static slots.

(5) Although the foregoing embodiments describe an example in which the ID is subjected to switching, the payload position may be subjected to switching. The payload position may be changed to a payload position which used to be empty, or the payload position and an existing payload position may be interchanged.

(6) Although the FlexRay protocol is used in the in-vehicle network in the foregoing embodiments, this is not a limitation. For example, CAN-FD (CAN with Flexible Data Rate), Ethernet, LIN (Local Interconnect Network), MOST (Media Oriented Systems Transport), or the like may be used. A network in which these networks are combined as sub-networks may also be used.

(7) Each device in the foregoing embodiments is specifically a computer system including a microprocessor, ROM, RAM, a hard disk unit, a display unit, a keyboard, a mouse, or the like. A computer program is recorded in the RAM or hard disk unit. The device achieves its functions by the microprocessor operating according to the computer program. The computer program is configured by combining multiple command codes indicating instructions to the computer, to achieve predetermined functions.

(8) Part or all of the structural elements constituting each device in the foregoing embodiments may be configured as a single system large scale integration (LSI). A system LSI is a super-multifunctional LSI manufactured integrating multiple components on a single chip, and specifically is a computer system including a microprocessor, ROM, RAM, and so forth. A computer program is recorded in the RAM. The system LSI achieves its functions by the microprocessor operating according to the computer program.

The parts of the structural elements constituting each device may be individually formed into one chip, or part or all thereof may be included in one chip.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

While description has been made regarding a system LSI, there are different names such as IC, LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(9) Part or all of the structural elements constituting each device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(10) The present disclosure may be the above-described methods, or may be a computer program which realizes these methods by a computer, or may be digital signals made up of the computer program.

The present disclosure may be the computer program or the digital signals recorded in a computer-readable recording medium, such as flexible disk, hard disk, CD-ROM, MO, DVD, DVD-ROM, DVD-RAM, Blu-Ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

The order in which the steps are performed in each flowchart is an example provided for specifically describing the presently disclosed techniques, and order other than the above may be used. Part of the steps may be performed simultaneously (in parallel) with other steps.

(11) The foregoing embodiments and variations may be combined in any way.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

With the presently disclosed techniques, the secure state of an in-vehicle network system as a whole can be maintained.

What is claimed is:

1. An anomaly handling method in an in-vehicle network, the anomaly handling method comprising:
   transmitting and receiving messages;
   detecting a message having an anomaly; and
   switching, when the anomaly is detected in the detecting, a transmission timing of the message in which the anomaly is detected,
   wherein the switching includes changing a switched transmission timing to which the transmission timing is switched, according to predetermined information,
   the predetermined information includes a number of times the anomaly is detected in the detecting,
   the switching includes determining, as the switched transmission timing, a transmission timing according to the number of times the anomaly is detected, and
   the switching includes calculating a hash value of the number of times the anomaly is detected, calculating a remainder of the hash value using a number of bits of a payload segment of the message in which the anomaly is detected, and determining, as the switched transmission timing, a transmission timing according to the remainder.

2. The anomaly handling method according to claim 1, wherein the switching further includes performing a bit shift operation process on a bit string forming the payload segment by a bit shift amount according to the remainder.

3. The anomaly handling method according to claim 1, wherein the predetermined information includes a vehicle state, and
   the switching includes determining, as the switched transmission timing, a transmission timing according to the vehicle state.

4. The anomaly handling method according to claim 1, wherein the switching is performed when a number of times the anomaly is detected in the detecting is greater than or equal to a predetermined number.

5. The anomaly handling method according to claim 1, wherein the switching is performed when an elapsed time from when the anomaly is detected last time is less than or equal to a predetermined time.

6. The anomaly handling method according to claim 1, wherein the switching includes, after the message in which the anomaly is detected is transmitted at the transmission timing of the message, switching the transmission timing of the message.

7. The anomaly handling method according to claim 1, wherein a communication scheme in the in-vehicle network is a time trigger-type communication scheme based on time slots,
   the transmitting and receiving includes transmitting and receiving the message in a predetermined time slot, and
   the switching includes determining a switched slot to which the transmission timing is switched, as the switched transmission timing.

8. The anomaly handling method according to claim 7, wherein the time slots include a plurality of empty slots to each of which no message is assigned, and
   the switching includes determining, as the switched slot, an empty slot according to the predetermined information.

9. An anomaly handling method in an in-vehicle network, the anomaly handling method comprising:
   transmitting and receiving messages;
   detecting a message having an anomaly; and
   switching, when the anomaly is detected in the detecting, a transmission timing of the message in which the anomaly is detected,
   wherein the switching includes changing a switched transmission timing to which the transmission timing is switched, according to predetermined information,
   the predetermined information includes information indicating a transmission time of the message in which the anomaly is detected,
   the switching includes determining, as the switched transmission timing, a transmission timing according to the information indicating the transmission time, and
   the switching includes generating a pseudorandom number using the information indicating the transmission time as a seed, calculating a remainder of the pseudorandom number using a number of bits of a payload segment of the message in which the anomaly is detected, and determining, as the switched transmission timing, a transmission timing according to the remainder.

10. An anomaly handling method in an in-vehicle network, the anomaly handling method comprising:
    transmitting and receiving messages;
    detecting a message having an anomaly; and
    switching, when the anomaly is detected in the detecting, a transmission timing of the message in which the anomaly is detected,
    wherein the switching includes changing a switched transmission timing to which the transmission timing is switched, according to predetermined information,
    the predetermined information includes a risk of the message in which the anomaly is detected,
    the switching includes determining, as the switched transmission timing, a transmission timing according to the risk,
    the switching is performed when the risk is greater than or equal to a first threshold, and
    the switching further includes performing, when the risk is greater than or equal to the first threshold, a bit shift operation process on a bit string forming a payload segment of the message in which the anomaly is detected, by a bit shift amount according to the risk.

11. The anomaly handling method according to claim 10, wherein the switching includes performing the bit shift operation process on the bit string forming the payload segment by the bit shift amount according to the risk, when the risk is greater than or equal to a second threshold and less than the first threshold, the second threshold being lower than the first threshold.

12. The anomaly handling method according to claim 10, wherein the switching includes determining, as the switched transmission timing, a plurality of transmission timings according to the risk, when the risk is greater than or equal to a third threshold that is higher than the first threshold.

13. An anomaly handling device in an in-vehicle network, the anomaly handling device comprising:
- a message transmitter/receiver that transmits and receives messages;
- a processor; and
- a memory including at least one set of instructions that, when executed by the processor, causes the processor to perform operations including:
  - detecting a message having an anomaly; and
  - switching, when the anomaly is detected in the detecting, a transmission timing of the message in which the anomaly is detected,
- wherein the switching includes changing a switched transmission timing to which the transmission timing is switched, according to predetermined information,
- the predetermined information includes a number of times the anomaly is detected in the detecting,
- the switching includes determining, as the switched transmission timing, a transmission timing according to the number of times the anomaly is detected, and
- the switching includes calculating a hash value of the number of times the anomaly is detected, calculating a remainder of the hash value using a number of bits of a payload segment of the message in which the anomaly is detected, and determining, as the switched transmission timing, a transmission timing according to the remainder.

14. An anomaly handling device in an in-vehicle network, the anomaly handling device comprising:
- a message transmitter/receiver that transmits and receives messages;
- a processor; and
- a memory including at least one set of instructions that, when executed by the processor, causes the processor to perform operations including:
  - detecting a message having an anomaly; and
  - switching, when the anomaly is detected in the detecting, a transmission timing of the message in which the anomaly is detected,
- wherein the switching includes changing a switched transmission timing to which the transmission timing is switched, according to predetermined information,
- the predetermined information includes information indicating a transmission time of the message in which the anomaly is detected,
- the switching includes determining, as the switched transmission timing, a transmission timing according to the information indicating the transmission time, and
- the switching includes generating a pseudorandom number using the information indicating the transmission time as a seed, calculating a remainder of the pseudorandom number using a number of bits of a payload segment of the message in which the anomaly is detected, and determining, as the switched transmission timing, a transmission timing according to the remainder.

15. An anomaly handling device in an in-vehicle network, the anomaly handling device comprising:
- a message transmitter/receiver that transmits and receives messages;
- a processor; and
- a memory including at least one set of instructions that, when executed by the processor, causes the processor to perform operations including:
  - detecting a message having an anomaly; and
  - switching, when the anomaly is detected in the detecting, a transmission timing of the message in which the anomaly is detected,
- wherein the switching includes changing a switched transmission timing to which the transmission timing is switched, according to predetermined information,
- the predetermined information includes a risk of the message in which the anomaly is detected,
- the switching includes determining, as the switched transmission timing, a transmission timing according to the risk,
- the switching is performed when the risk is greater than or equal to a first threshold, and
- the switching further includes performing, when the risk is greater than or equal to the first threshold, a bit shift operation process on a bit string forming a payload segment of the message in which the anomaly is detected, by a bit shift amount according to the risk.

* * * * *